US012045699B2

(12) United States Patent
DePoy et al.

(10) Patent No.: US 12,045,699 B2
(45) Date of Patent: Jul. 23, 2024

(54) ESTIMATING DIRECTION OF ARRIVAL OF ELECTROMAGNETIC ENERGY USING MACHINE LEARNING

(71) Applicant: DeepSig Inc., Arlington, VA (US)

(72) Inventors: Daniel DePoy, Arlington, VA (US); Timothy Newman, Arlington, VA (US); Nathan West, Arlington, VA (US); Tamoghna Roy, Arlington, VA (US); Timothy James O'Shea, Arlington, VA (US); Jacob Gilbert, Arlington, VA (US)

(73) Assignee: DeepSig Inc., Arlington, VA (US)

( * ) Notice: Subject to any disclaimer, the term of this patent is extended or adjusted under 35 U.S.C. 154(b) by 8 days.

(21) Appl. No.: 17/587,640

(22) Filed: Jan. 28, 2022

(65) Prior Publication Data
US 2023/0144796 A1    May 11, 2023

Related U.S. Application Data

(60) Provisional application No. 63/142,893, filed on Jan. 28, 2021.

(51) Int. Cl.
*G06N 20/00* (2019.01)
*G01S 5/02* (2010.01)
(Continued)

(52) U.S. Cl.
CPC ............ *G06N 20/00* (2019.01); *G01S 5/0215* (2013.01); *G01S 5/04* (2013.01); *G01S 7/4052* (2013.01);
(Continued)

(58) Field of Classification Search
CPC ........ G01S 5/0215; G01S 5/04; G01S 7/4052; G01S 13/426
(Continued)

(56) References Cited

U.S. PATENT DOCUMENTS

| 2015/0255868 A1* | 9/2015 | Haddad ................. H04B 17/12 |
| | | 342/368 |
| 2016/0011292 A1* | 1/2016 | Li ............................ G01S 3/58 |
| | | 342/359 |

(Continued)

FOREIGN PATENT DOCUMENTS

WO    WO 2020/245834 A1    12/2020

OTHER PUBLICATIONS

International Search Report and Written Opinion in International Appln. No. PCT/US2022/14387, mailed on Oct. 14, 2022, 10 pages.
(Continued)

*Primary Examiner* — Bo Fan
(74) *Attorney, Agent, or Firm* — Fish & Richardson P.C.

(57) ABSTRACT

Methods, systems, and apparatus, including computer programs encoded on computer-storage media, for positioning a radio signal receiver at a first location within a three dimensional space; positioning a transmitter at a second location within the three dimensional space; transmitting a transmission signal from the transmitter to the radio signal receiver; processing, using a machine-learning network, one or more parameters of the transmission signal received at the radio signal receiver; in response to the processing, obtaining, from the machine-learning network, a prediction corresponding to a direction of arrival of the transmission signal transmitted by the transmitter; computing an error term by comparing the prediction to a set of ground truths; and updating the machine-learning network based on the error term.

20 Claims, 7 Drawing Sheets

(51) Int. Cl.
  *G01S 5/04* (2006.01)
  *G01S 7/40* (2006.01)
  *G01S 13/42* (2006.01)
  *G06N 3/08* (2023.01)
  *G06N 3/084* (2023.01)
  *G06N 20/20* (2019.01)
  *H04B 17/318* (2015.01)
  *H04B 17/336* (2015.01)
  *H04B 17/391* (2015.01)

(52) U.S. Cl.
  CPC .............. *G01S 13/426* (2013.01); *G06N 3/08* (2013.01); *G06N 3/084* (2013.01); *G06N 20/20* (2019.01); *H04B 17/318* (2015.01); *H04B 17/336* (2015.01); *H04B 17/391* (2015.01)

(58) Field of Classification Search
  USPC .................... 342/147, 127, 160, 104, 22, 70
  See application file for complete search history.

(56) References Cited

U.S. PATENT DOCUMENTS

| | | | | |
|---|---|---|---|---|
| 2018/0060476 | A1* | 3/2018 | Kasch | G01D 15/06 |
| 2018/0322389 | A1* | 11/2018 | O'Shea | G06N 3/08 |
| 2018/0371897 | A1* | 12/2018 | Ang | E21B 47/113 |
| 2020/0184027 | A1* | 6/2020 | Dolan | G06F 30/20 |
| 2020/0343985 | A1* | 10/2020 | O'Shea | G06N 3/08 |

OTHER PUBLICATIONS

International Preliminary Report on Patentability in International Appln. No. PCT/US2022/14387, mailed on Aug. 10, 2023, 9 pages.

* cited by examiner

ESTIMATING DIRECTION OF ARRIVAL OF ELECTROMAGNETIC ENERGY USING MACHINE LEARNING

CROSS-REFERENCE TO RELATED APPLICATIONS

This application claims the benefit of priority of U.S. Provisional Application No. 63/142,893, filed Jan. 28, 2021, the contents of which are incorporated here by reference in their entirety.

STATEMENT REGARDING FEDERALLY SPONSORED RESEARCH OR DEVELOPMENT

This invention was made with United States government support under Grant FA864919PA464 awarded by the Air Force Research Laboratory. The United States government has certain rights in the invention.

FIELD

This specification generally relates to systems that use machine learning and includes processing of electromagnetic energy of signals using a machine-learning network.

BACKGROUND

Many systems involve transmitting and receiving various types of signals that emit electromagnetic (EM) energy. For example, many types of radar, wireless communication systems, Radio Frequency Identification (RFID) systems, and geo-positioning systems use signals radiating EM energy.

SUMMARY

The present disclosure includes methods and systems for automated techniques to estimate the direction of arrival (DoA) of electromagnetic (EM) energy. In some implementations, the EM energy corresponds to the energy of RF communications signals transmitted or received over communications channels. In some of these implementations, the EM energy of the RF signals represents the information carried by these signals. In some implementations, the EM energy corresponds to energy of other types of signals, such as signals used by radar systems, RFID systems, or geo-positioning systems, among other suitable types of systems. In the following sections, the methods and systems are described primarily with respect to communications systems and RF signals used in such systems. However, the methods and systems are equally applicable to signals used in other systems, including those noted above. Further, references to EM energy are meant to indicate EM energy of signals that are transmitted or received, or both.

In general, the subject matter described in this disclosure can be embodied in methods, apparatuses, and systems for training and deploying machine-learning networks within a system for identifying the DoA of incoming communications signals, such as RF signals. In some implementations, the communications signals include digital communications signals. Identifying DoA can include identifying the source of some radiated EM energy of a signal by estimating a vector, such as a unit vector, which points towards the source.

In some implementations, systems for identifying DoA of incoming communication signals include machine learning components that are trained and deployed. For example, systems for identifying DoA of incoming communication signals can include neural networks, such as Deep Neural Networks (DNNs), as machine learning components used for generalized auto-regression of the incoming communication signals. Systems that use trained neural network models can more accurately identify DoA from energy sources, and from non-uniform antenna arrays particularly, compared to existing methods. Advantageous implementations allow antenna manufacturers to produce antennas with more loose tolerances, which can reduce the cost of deployment for various network components while maintaining, or improving, efficacy.

In some implementations, machine-learning networks used in a system for identifying the DoA are trained, in part, by: positioning a radio signal receiver at a first location within a three dimensional space; positioning a transmitter at a second location within the three dimensional space; transmitting a transmission signal from the transmitter to the radio signal receiver; processing, using a machine-learning network, one or more parameters of the transmission signal received at the radio signal receiver; in response to the processing, obtaining, from the machine-learning network, a prediction corresponding to a direction of arrival of the transmission signal transmitted by the transmitter; computing an error term by comparing the prediction to a set of ground truths; and updating the machine-learning network based on the error term.

One innovative aspect of the subject matter described in this specification is embodied in a method that includes positioning a radio signal receiver at a first location within a three dimensional space; positioning a transmitter at a second location within the three dimensional space; transmitting a transmission signal from the transmitter to the radio signal receiver; processing, using a machine-learning network, one or more parameters of the transmission signal received at the radio signal receiver; in response to the processing, obtaining, from the machine-learning network, a prediction corresponding to a direction of arrival of the transmission signal transmitted by the transmitter; computing an error term by comparing the prediction to a set of ground truths; and updating the machine-learning network based on the error term.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The foregoing and other embodiments can each optionally include one or more of the following features, alone or in combination. For instance, in some implementations, the prediction includes two or more angle probabilities, where each angle probability of the two or more angle probabilities indicates a likelihood of the transmission signal having arrived at a particular angle.

In some implementations, the three dimensional space is simulated, and actions include generating a simulation of the radio signal receiver at the first location within the simulated three dimensional space; and generating a simulation of the transmitter at the second location within the simulated three dimensional space.

In some implementations, actions include obtaining, from a real-world radio, a second transmission signal received at the real-world radio; generating a direction of arrival estimate based on the second transmission signal using an estimation algorithm; processing the second transmission signal using the machine-learning network; in response to the processing, obtaining, from the machine-learning network, a second prediction corresponding to a direction of arrival of the second transmission signal; comparing the direction of arrival estimate to the second prediction; and updating the machine-learning network based on comparing the direction of arrival estimate to the second prediction.

In some implementations, the estimation algorithm includes at least one of a first direction of arrival algorithm or a second direction of arrival algorithm.

In some implementations, generating the direction of arrival estimate based on the second transmission signal using the estimation algorithm includes generating a first component of the direction of arrival estimate, where the first component includes output of the first direction of arrival algorithm; weighting the first component by a first weight; generating a second component of the direction of arrival estimate, where the second component includes output of the second direction of arrival algorithm; weighting the second component by a second weight; and combining the weighted first component and the weighted second component to generate the direction of arrival estimate.

In some implementations, actions include rotating the transmitter within the simulated three dimensional space during transmission of the transmission signal.

In some implementations, the set of ground truths are obtained based on location data for the radio signal receiver and the transmitter.

In some implementations, actions include rotating the synthetic radio within the simulated three dimensional space during transmission of the transmission signal.

In some implementations, actions include obtaining details of a feature within a real-world environment; and generating a synthetic rendering of the feature in the simulated three dimensional space.

In some implementations, the details of the feature within the real-world environment are provided by a user.

In some implementations, the transmission signal reflects off a surface of the synthetic rendering of the feature.

In some implementations, actions include generating a data set including information corresponding to the machine-learning network; and providing the data set to one or more processors through a network connection, where the one or more processors are configured to update local machine-learning networks based on the data set.

In some implementations, the machine-learning network includes one or more of a transformer neural network, a regression neural network, a fully convolutional neural network, or a partially convolutional neural network.

In some implementations, updating the machine-learning network based on the error term includes determining, based on a loss function, a rate of change of one or more weight values within the machine-learning network; and performing an optimization process using the rate of change to update the one or more weight values within the machine-learning network.

In some implementations, the optimization process includes one or more of gradient descent, stochastic gradient descent (SGD), Adam, RAdam, AdamW, or Lookahead neural network optimization.

In some implementations, the optimization process involves minimizing a loss value between predicted and actual values of subcarriers or channel responses.

In some implementations, the one or more parameters of the transmission signal include a power level associated with the transmission signal.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
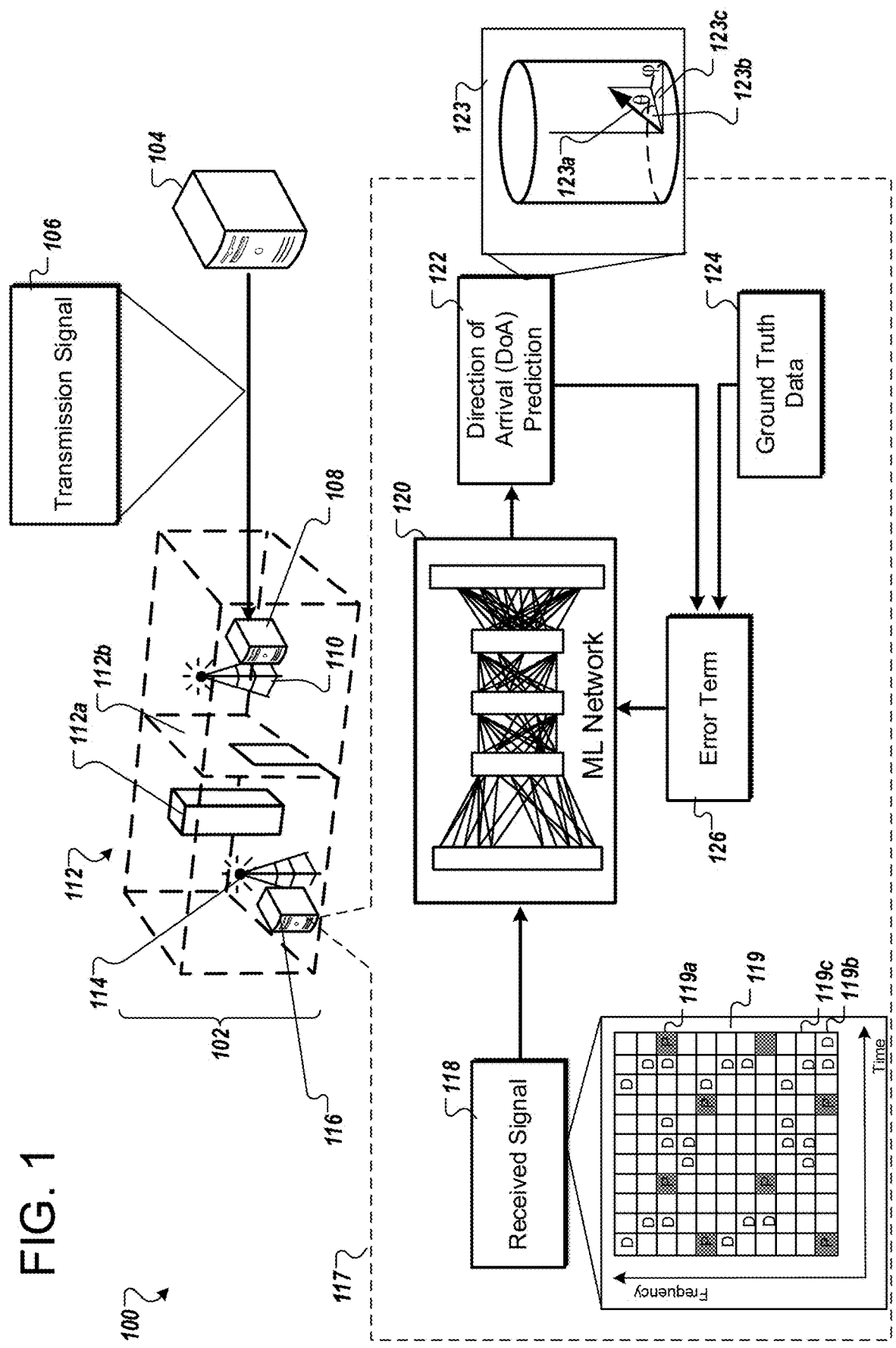
FIG. 1 is a diagram showing an example of a system for training a machine learning model for estimating DoA of electromagnetic energy.

FIG. 1 is a diagram showing an example of a system 100 for training a machine learning model 120 for estimating DoA of electromagnetic energy. The system 100 includes the computer instances 104, 108, and 116. In some implementations, the computer instances 108 and 116 are generated by the computer instance 104. For example, the computer instances 108 and 116 can be simulated computing components interacting in a simulated environment, such as environment 102, and operations corresponding to the computer instances 108 and 116 can be performed by the computer 104. In some implementations, the computer instances 104, 108, and 116 are real-world computing components and the environment 102 is a real-world environment.

As shown in the example of FIG. 1, a signal 106 is sent from the computer 104 to the computer 108. The computer 108 configures the signal 106 for transmission using antenna 110. The antenna 110 transmits the signal 106 within the environment 102. The environment 102 includes various environmental features 112. For example, in some cases, the environment 102 includes a partition 112b with a doorway and an obstacle 112a, as shown. In general, the environment 102 can include any suitable features, including being an open-air environment with or without obstacles.

In some implementations, the antenna 110 includes various RF components for generating and transmitting the signal 106. For example, the antenna 110 includes amplifiers, filters, attenuators, or other components which effect the signal 106. In some implementations, the antenna 110 includes a digital to analog converter (DAC). For example, the DAC of the antenna 110 can convert data corresponding to the signal 106 into one or more modulation signals in frequency space that propagate in the environment 102.

In some implementations, the environment 102 is configured to include specific features similar to an environment of deployment. For example, in the simulation case, the environment 102, environment features 112, computer instances 108 and 116, and antennas 110 and 114 are generated by the computer 104. In this case, the computer 104 can generate synthetic representations of real-world environmental features corresponding to an environment of deployment. For example, if the machine-learning network 120 will be deployed in an office environment, the computer 104 can generate synthetic representations of office features, such as desks, other computers, doorways, and the like. In general, any particular environment of deployment can be synthetically generated this way.

In the real-world case, the environment 102, environment features 112, computer instances 108 and 116, and antennas 110 and 114 are real-world objects. In this case, a user can manually position the computers 108 and 116, the antennas 110 and 114, as well as various environmental features, such as environmental features 112. Similar to the simulation case, the real-world environment 102 can be adjusted by locating the real-world computers 108 and 116 and antennas 110 and 114 within an existing environment or environment constructed by the user. The environment can be the same or similar to an environment of deployment. For example, the computers 108 and 116 and antennas 110 and 114 can be located in an office for training the machine-learning network 120 to identify DoA within an office environment. In general, any environment can be trained for based on adjusting the real-world or simulated environment 102.

The antennas 110 and 114 include arrays with one or more elements. The one or more elements have either uniform, non-uniform, or non-regular element spacing. In at least one implementation, the antenna 110 is a non-uniform array of more than one element. The antenna 114 can also be a non-uniform array of more than one element. With traditional approaches, the non-uniform array of at least the antenna 110 does not conform to mathematical assumptions and would lead to inaccuracies if computing DoA with traditional algorithms. However, after training, the machine learning network 120 can effectively process even signals from the antenna 110 when the antenna 110 includes a non-uniform array. Because the machine learning network 120 does not rely on mathematical assumptions the way traditional DoA methods do, the machine learning network 120 is able to more accurately and efficiently identify the resulting DoA. Importantly, by accurately identifying DoA without requiring uniformity, the machine learning network 120 effectively reduces the cost of deploying network components by improving the efficacy of non-uniform arrays which traditionally can be considered defective.

After the antenna 110 transmits the signal 106 within the environment 102, the signal 106 reflects and passes through the various environmental features 112 within the environment 102. The reflection and permeability of the environmental features depends, in part, on the signal 106 frequencies and the material of the environmental features. For example, drywall can be more permeable, for a given frequency of electromagnetic radiation, than steel. Furthermore, the geometry of environmental features 112 affect the propagation of the signal 106 within the environment 102, e.g., by affecting the reflection of the propagating signal 106 in space.

In implementations where the environment 102 is a real-world environment, the traits of the signal 106 and the features 112 are automatically available. In implementations where the environment 102 is a simulation, the computer 104 can generate each feature of the features 112 with traits that affect the propagation of electromagnetic energy of the signal 106.

The signal 106 is received by the antenna 114 of the computer 116. As discussed herein, the signal 106 propagates in the environment 102 by being absorbed and reflected by various environmental features 112. As a result, the signal received by the antenna 114, e.g., received signal 118, is not necessarily identical to the signal 106.

In some implementations, the computer 116 includes one or more components and performs one or more operations. For example, the computer 116 can include one or more of the components and operations within the graphical boundary 117, shown for illustration purposes. The components shown within the boundary 117 include the received signal 118, the machine learning network 120, the prediction 122, the ground truth data 124, and the error term 126. The operations shown within the boundary 117 include providing the received signal 118 to the machine learning network 120, obtaining output of the machine learning network 120, such as the prediction 122, obtaining ground truth data 124, comparing the output of the machine learning network 120 with the ground truth data 124, and updating the machine learning network 120 based on the comparison of the output of the machine learning network 120, such as the prediction 122, and the ground truth data 124. As described herein, the comparison between the prediction 122 and the ground truth data 124, in some implementations, includes the error term 126.

In some implementations, the antenna 114 includes one or more RF components. For example, the antenna 114, or connected computer 116, can include an analog to digital converter (ADC). The ADC can convert the analog data of the received signal 118 to digital data.

In some implementations, the signal 106 and the received signal 118 are Orthogonal Frequency-division Multiplexing (OFDM) or Cyclic-Prefix OFDM (CP-OFDM) signal (e.g., in the 3GPP 5G-NR uplink (UL) or downlink (DL) PHY), as shown graphically as a received input plot 119 that is a time-frequency spectrum grid of pilot and data subcarriers and time slots within an OFDM signal block. Each grid element in the input plot 119 is referred to as a tile, e.g., tiles 119a and 119b. The tiles 119a and 119b represent a pilot subcarrier and data subcarrier, respectively.

The visual symbols as shown in the input plot 119 are for illustration purposes only. Although the tile 119a is a pilot subcarrier and the tile 119b is a data subcarrier, both the tiles 119a and 119b are resource elements or subcarriers that carry information of the signal 106. The input plot 119 can also be referred to as an unequalized resource grid that includes tiles. The subcarriers carry pilot (reference) signals or tones in pilot tiles, and data signals or tones in data tiles. The pilot tiles include filled-in tiles with the letter "P", e.g., tile 119*a*. The data tiles are shown as non-filled-in tiles with the letter "D", e.g., tile 119*b*. Unoccupied tiles not denoting pilot or data subcarriers are shown as non-filled-in tiles without any letter, e.g., tile 119*c*. In some cases, all tiles within the input plot 119 are occupied, e.g., with pilot or data subcarriers, or both.

In some implementations, pilot and data information, such as pilot and data subcarriers, or other resource elements are transmitted in the signal 106. In other implementations, only pilot information or only data information are transmitted and a non-data-aided learned approach can be used. In some cases, subcarriers change between pilot and data information elements several times over a given slot. Pilot and data information can be used to refer to pilot subcarriers, data subcarriers, pilot resource elements, or data resource elements, or any combination of these.

In some implementations, the signal 106 and the received signal 118 include in-phase and quadrature (IQ) components. For example, the signal 106 can include baseband and passband signals. Modulating components of the antenna 110 and computer 108 can generate the signal 106 by modulating baseband and passband signals using both in-phase and quadrature (IQ) components. The receiving components of the antenna 114 and the computer 116 can receive the in-phase and quadrature (IQ) components of the transmitted signal and generate corresponding data. The computer 116 can provide the data generated from the received signal 118 to the machine learning network 120.

In some implementations, the computer 116 operates the machine learning network 120. In some implementations, the computer 116 is communicably connected to a device that operates the machine learning network 120. In the example of FIG. 1, the computer 116 provides data corresponding to the received signal 118 to the machine learning network 120. In some implementations, the data corresponding to the received signal 118 includes the received signal 118. For example, the computer 116 can directly input the received signal 118 from the antenna 114 to the machine learning network 120.

In some implementations, the computer 116 preprocesses the received signal 118. For example, the computer 116 can preprocess the received signal 118 to generate data corresponding to the received signal 118 before providing the data to the machine learning network 120. In some implementations, the input to the machine learning network 120 includes one or more of raw or filtered IQ data, such as time series sampled radio data. The time series sampled radio data can be represented in in-phase (I) and quadrature (Q) complex baseband representation.

The computer 116 obtains the output of the machine learning network 120.

The output of the machine learning network 120 includes a DoA prediction 122. In some implementations, the output of the machine learning network 120 includes N neurons or output values each representing either a heading (e.g., a heading between 0 and 360 degrees) or a Null condition, indicating no signal. In the three-dimensional case, the output neurons can be pairs, corresponding to Azimuth and Elevation.

In some implementations, the output of the machine learning network 120 includes an array transformation matrix. For example, for a given field of view corresponding to the antenna 114, the computer 116 or the machine learning network 120 can split the field of view into discrete sectors. The machine learning network 120 can provide a transformation matrix estimating the signal response of the signal 106 in each sector. In some implementations, such as cases of impaired antenna arrays, breaking the field of view into discrete sectors can improve processing by allowing the machine learning network 120 to generate output more closely fitted to an ideal linear estimation problem for DoA estimation in each discrete sector.

In some implementations, the output of the machine learning network 120 includes a single direction represented in three-dimensional space. Item 123 is a graphical representation illustrating such a direction as a vector 123*a* in cylindrical coordinate system. In general, any coordinate system can be used in the output of the machine learning network 120 to identify the DoA. In the cylindrical coordinate system implementation, the vector 123*a* can include elevation 123*b* and azimuth 123*c*. In Cartesian coordinates, the DoA can be represented as a unit vector with three values representing x, y, and z components of the unit vector. Other direction representation techniques known in the art can similarly be used to represent the DoA prediction 122 of the machine learning network 120.

The computer 116 obtains ground truth data 124. In some implementations, the ground truth data 124 is generated based on a known direction or position of either the antenna 110 or the antenna 114 or both the antenna 110 and the antenna 114. For example, in the case where the environment 102 is a real-world environment, the computer 116 can obtain information from a user or other system monitoring the environment 102 that indicates a positioning or direction information of the antennas 110 and 114. In some implementations, the user or other system monitoring the environment 102 can directly input positioning or direction information of the antennas 110 and 114 to the computer 116.

In another example, in the case where the environment 102 is a simulated environment, the computer 104 can, after generating the positioning and direction of both the antennas 110 and 114, provide the positioning and direction of both the antennas 110 and 114 to the computer 116.

Based on the positioning or direction information of the antennas 110 and 114, the computer 116 can determine the actual DoA as the ground truth data 124. The computer 116 can determine a direction of a line that connects the antennas 110 and 114 as the DoA.

In some implementations, the ground truth data 124 is generated using one or more traditional DoA methods. For example, the computer 116 can generate one or more outputs corresponding to one or more traditional DoA algorithms. DoA algorithms can include conventional beam forming, beam former, minimum variance beam formers, subspace methods (e.g., decomposing a covariance matrix in eigen-pairs), as well as hybrid methods. In hybrid methods, the computer 116 can use multiple traditional DoA approaches and weight the outputs of the multiple DoA approaches to generate a weighted output. In some implementations, the output is weighted based on a current environment. For example, a first DoA algorithm may perform better in a first type of environment than a second DoA algorithm. After detecting the environment 102 is more similar to the first type of environment than another type of environment, the computer 116 can weight the DoA algorithm greater than the second DoA algorithm. In this way, the weighted output can be more accurate than any single DoA algorithm.

In some implementations, the computer 116 defaults to traditional methods for less complex environments. For example, if the computer 116 detects, based on features of the signal 106 or based on direct communication from a sensor or user within the system 100, that the environment 102 has few features or the features do not impact the propagation of the signal 106, the computer 116 can use traditional methods for generating the ground truth data 124 during cases such as over the air training. In these cases, the computer 116 can use a difference between the prediction 122 and the ground truth data 124 to generate the error term 126. In some implementations, the error term 126 is an array with one or more elements indicating one or more difference values between the prediction 122 and the ground truth data 124.

Generating the ground truth data 124 using one or more traditional DoA methods can be used in a semi-supervised training situation where exact ground truth data is not available. In this case, the computer 116 can compare the prediction 122 with the ground truth data 124 generated using one or more traditional DoA algorithms. In some implementations, the computer 116 determines if a difference value representing the difference in the DoA of the prediction 122 and the DoA of the one or more traditional DoA algorithms satisfies a difference threshold. For example, if the difference satisfies a threshold, the computer 116 can generate an error term 126. If the difference does not satisfy a threshold, the computer 116 can use the prediction 122 or the weighted output, depending on implementation.

The computer 116 generates the error term 126 based on comparing the prediction 122 to the ground truth data 124. In some implementations, the computer 116 computes a loss function, which measures a distance (e.g., a difference) between the prediction 122 and the ground truth data 124. In some cases, this loss or difference may also include a maximum of an L1 loss or scaled L1 loss, and an L2 loss or scaled L2 loss, combining multiple distance metrics to exploit the best properties of both L1 and L2 loss convergence in their differing performance regions. This process may be referred to as the changeover value in denominator loss, or the constellation value inverse decay loss. In some cases, a rate of change of the loss function is used to update one or more weights or parameters within the machine-learning network 120.

In some implementations, ground truth data 124, or data used to generate the ground truth data 124, is transmitted over the air from the antenna 110 to the computer 116. For example, the ground truth data 124 can include positioning or direction information of the antenna 110 or the antenna 114 or both the antennas 110 and 114. The antenna 110 and computer 108 can determine, either based on preprogrammed position or direction, or based on a current location determined from a positioning system (e.g., global positioning system (GPS)), a current position and direction of the antenna 110. The antenna 110 can include the information in the signal 106 or in another signal transmitted to the antenna 114.

Model updates calculated in the system 100 by elements such as the computer 116 allow predictions of the machine learning network 120 to improve over time and iteratively provide improved predictions of DoA upon training in representative environments. In some implementations, baseline models are used to provide estimation. In other implementations, the machine learning network 120 is used to provide estimations with a form of error feedback to enable iterative training.

Training the machine-learning network 120 can take place using one or more received input signals as input data for the machine learning network 120. In some implementations, given input data is used for two or more iterations and the machine-learning network 120 learns to model particular parameters or weights based on the given input data. In other implementations, new data is used for each iteration of training. In some cases, data used for training the machine-learning network can be chosen based on aspects of the data. For example, in a scenario where data sent in a particular environment is affected in a particular way, either because of the geometry or composition of various environmental elements, the machine-learning network 120 can learn the particular effect and generate a predicted DoA of the corresponding signal with more accuracy and with less complexity and power usage compared to traditional systems. In some cases, data or models for users of different environments may be employed or aggregated further to train specific models for sets of users or user scenarios within various sectors or cells.

In some implementations, the computer 116 detects trends or other data related to one or more calculations performed by the machine learning network 120. This data can be used to inform specific weight or parameter modifications within the machine learning network 120. In some cases, augmentations may be applied to the input data in order to magnify the effective number of input values that are being optimized, for example the phase, amplitude, fading or other effects applied to the input value may be altered upon input to the machine learning network update process based on the error term 126 in order to accelerate training on a smaller quantity of data.

In some implementations, a set of profiles, such as urban, rural, indoor, macro, micro, femto, or other profiles related to DoA prediction is used to determine an initial model of the machine learning network 120 that is deployed. The initial model of the machine learning network 120 can be further trained after deployment within a particular environment. In some implementations, data or models may be shared in cloud environments or network sharing configurations to improve initial machine-learning network models, or to jointly improve models within multiple environments with shared phenomena. For example, cells within a grid of cells that share similar interference, cells with similar delay spreads, or cells with other similar behaviors, can be used to improve the effectiveness, speed, or performance of the machine learning network 120.

In some implementations, the machine learning network 120 is pre-trained. Pre-training can be based on simulation. Pre-training, depending on implementation, can use simplified statistical models (e.g., Rayleigh or Rician, among others), a COST 2100 model, tapped delay line (TDL-A, TDL-B, TDL-x, among others) model, or standard Long Term Evolution (LTE) or New Radio (NR) channel model, among other models. Pre-training can also use Ray tracing or geometric model of sector for deployment or channel generative adversarial network (GAN) machine learning networks trained to reproduce the environmental effects on propagating signals within an environment based on prior measurement or simulation.

In some implementations, training the machine learning network 120 includes using other estimation or equalization approaches. For example, minimum mean square error (MMSE), linear MMSE, max likelihood, successive interference cancellation (SIC), or other suitable approaches can be used to produce DoA predictions for the signal 106. These approaches can be used in certain instances (e.g., when the machine learning network 120 is not well trained) or the training may use an existing learned model to produce the DoA predictions and use information such as decision or forward error correction (FEC) feedback to improve machine learning network models, such as the machine learning network 120, prior to training. In the latter case, transition from a general statistical model to a learned model may occur when the difference between a prediction of the machine learning network 120 and known ground truth data satisfies a threshold or where the performance of the learned model outperforms the general statistical model.

In some cases, augmentation is used to improve or accelerate the training of the machine learning network 120. In such cases, multiple copies of data specific to training may be used with different augmentations when training the machine learning network 120. For example, different effects such as noise, phase rotation, angle of arrival, or fading channel response, among others, can be applied to the received signal 118 creating copies of training data. The copies of data can be used to increase the amount of effective usable training data available from a finite or smaller set of measurement data into a near infinite set of augmentation measurement or simulated data. This can assist in faster model training of the machine learning network 120, training more resilient, more generalizable, or less-overfit models used for the machine learning network 120, over much less data and training time, among others.

As shown in FIG. 1, EM energy of the signal 106 is radiated as electric and magnetic fields originating from the antenna 110. The fields propagate volumetrically according to the geometry of the antenna 110 and the environmental features 112 of the environment 102. In the case of an ideal isotropic emitter, the fields can propagate as a sphere of oscillating EM potential which expands at the speed of light. Transmission of EM energy can be both a temporally and spatially dynamic process that evolves in a deterministic manner, originating from the source, such as the antenna 110.

There are a number of ways by which the source of energy may be localized by observing dynamics at one or more antenna elements, such as the antenna 114. Localization can be done for many reasons. For example, localization of a source of energy can be used to estimate the location of an RF transmitter, a line of bearing on this transmitter, among others. Localization can be useful in radar for estimating locations from which radar pulses are emitted or reflected, in communications systems for identifying spatial properties or locations of users in order to accurately model user behavior or optimize radio system performance, to map emitter or interferer locations, to perform channel or propagation mapping, or to detect changes in the locations, behaviors or properties of RF emitters.

In this case, RF emitters, such as the antenna 110 and connected computer 108, can include a wide variety of devices and radio standards. These include, for example, hand held radios (e.g. Project 25 (P25), Digital Mobile Radio (DMR), frequency modulation (FM), Terrestrial Trunked Radio (Tetra), military radios, among others), cellular (e.g., Personal Communications Service (PCS)) communications systems, telemetry systems, radar systems, beacon systems, Wi-Fi systems (e.g., wireless Local Area Network (WLAN)), wireless personal area networks (WPAN) such as Bluetooth, low-power wide-area network (LPWAN) systems such as Lora, SigFox, among others. The devices and radio standards also include a range of other devices such as unintended RF emissions from devices such as power lines, transformers, computing equipment, microwave ovens, or other intended or unintended sources, which can be located through means that involve DoA or other localization methods.

Estimating the DoA or Angle of Arrival (AoA) of incident EM energy finds practical application in a number of different areas. For example, among other things, it is useful in the discovery, localization, and classification of information carrying EM signals, of the type employed by many types of radar, wireless communication systems, Radio Frequency Identification (RFID) systems, and terrestrial geo-positioning systems. In one implementation, the system 100 employs a series of Machine Learning (ML) algorithms and Deep Neural Networks (DNNs), such as the machine learning network 120, trained by supervised and semi-supervised methods, to perform generalized DoA regression on one or more EM signals. The EM signals can be received by an antenna array, such as the antenna 114, with one element, or more than one element, having either uniform, non-uniform, or non-regular element spacing.

This disclosure provides techniques to perform direct auto-regression of the DoA problem (i.e. determining the angles of arrival as shown in FIG. 1) using Neural Networks (or other similar parametric computational graphs or compact inference networks derived therefrom), from an input stream of real or complex valued (e.g. In-Phase and Quadrature) samples originating from a radio receiver, connected to a multi-element antenna array, such as the antenna 110 and computer 108.

The disclosed techniques are able to exceed the computational performance of traditional methods, as well as increase the capacity and flexibility of a given antenna array. Because the neural network can be viewed as a generalized non-linear regression engine, much of the linear systems theory which largely constrains other DoA estimation methods does not likewise constrain this method. These distinctions are important because they allow for the deployment of imperfect arrays around arbitrary object geometries, which can be much cheaper and easier to deploy and operate, and can be realized on much lower cost computer hardware and platforms than traditional high computational complexity algorithms, allowing the disclosed techniques to drastically improve the ease and cost of deployment of radio direction finding and localization systems utilizing such techniques.

The disclosed techniques can also enable many new applications such as direction finding across distributed applications such as vehicles, unmanned aerial vehicles (UAVs), Boats, air vehicles, space vehicles, buildings, among others, which are not flat or uniform array surfaces, and onto much smaller compute platforms such as small low power embedded systems with low cost hardware. The disclosed techniques can help make such technology widely attractive for a wide range of commercial and defense deployment scenarios. In addition, the disclosed direct regression approach allows learned specialization which would be unattainable for traditional techniques as demonstrated in FIG. 1 where the machine learning network 120 is trained to learn the multipath profiles of a multi-room environment 102, allowing it to effectively "see through" the partition 112*b*.

That is, the predicted DoA 122 of the trained machine-learning network 120 can identify the direction towards the actual antenna 110 instead of being "fooled" by the propagation of the signal which, because of the opening in the partition 112*b*, may appear to come from the opening. In some implementations, the machine learning network 120 learns a particular angle of propagation from the opening of the partition 112*b* as indicative of a DoA corresponding to an actual location of the antenna 110. For example, the machine learning network 120 can generate a DoA prediction identifying the direction to the actual location of the antenna 110, instead of an apparent location based on a given propagating transmission signal, such as the signal 106.

In some implementations, either the antenna 110 or the antenna 114 rotates. For example, antenna 110 can rotate while transmitting one or more signals of the signal 106. The one or more signals can each be sent at different points within the rotation of the antenna 110. In this way, the system 100 can generate training data from all of the points along the rotation and train the machine learning network 120 to determine a DoA based on each point and angle of transmission. In this way, the machine learning network 120 can learn a larger portion of the environmental features 112 and how the features 112 affect signal propagation and DoA. In another example, the antenna 114 can rotate. As discussed herein for rotation of the antenna 110, rotation can be used to generate additional training data for the machine learning network 120.

Figure 2A:
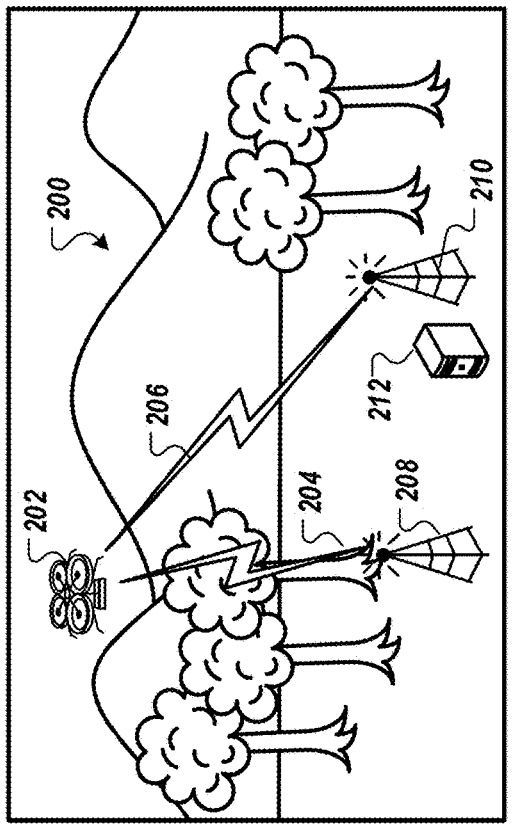
FIG. 2A is a diagram showing an example of a system for estimating DoA of electromagnetic energy in a rural environment.

FIG. 2A is a diagram showing an example of a system 200 for estimating DoA of electromagnetic energy in a rural environment. The system 200 includes drone 202, antenna arrays 208 and 210, and computer 212. As discussed herein, the drone 202 can include one or more non-uniform array elements that would lead to inaccuracies in DoA estimation using traditional methods. In the example of FIG. 2A, the drone 202 transmits signals 204 and 206 to the antenna arrays 208 and 210. The antennas 208 and 210 include at least one element each. In some implementations, the drone 202 sends signals that are received at a single antenna array with two or more antenna elements. The computer 212 can process the signals 204 and 206 as discussed with respect to FIG. 2C.

Figure 2B:
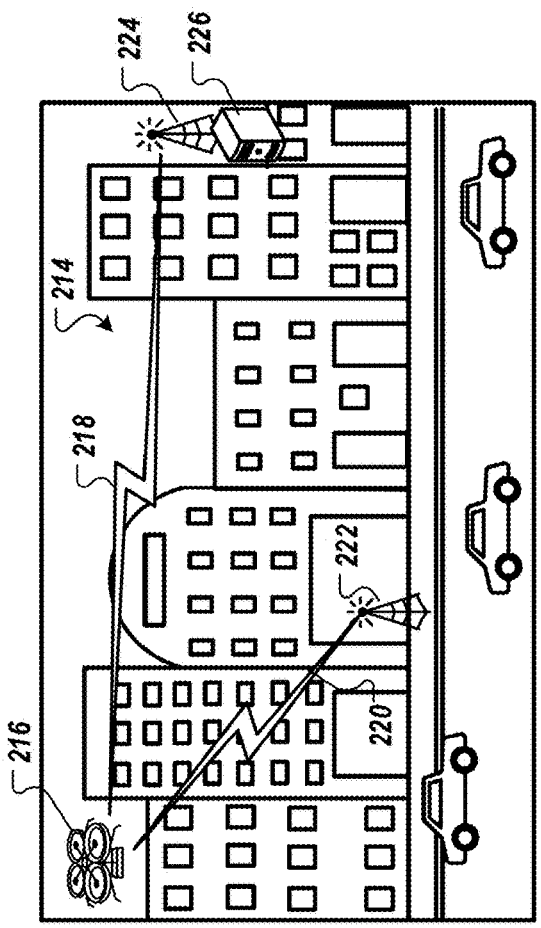
FIG. 2B is a diagram showing an example of a system for estimating DoA of electromagnetic energy in an urban environment.

FIG. 2B is a diagram showing an example of a system 214 for estimating DoA of electromagnetic energy in an urban environment. The system 200 includes drone 216, antenna arrays 222 and 224, and computer 226. As discussed herein, and in reference to FIG. 2A, the drone 216 can include one or more non-uniform array elements that would lead to inaccuracies in DoA estimation using traditional methods. In the example of FIG. 2B, the drone 216 transmits signals 218 and 220 to the antenna arrays 222 and 224. The antennas 222 and 224, similar to the antennas of FIG. 2A, include at least one element each. In some implementations, the drone 216 sends signals that are received at a single antenna array with two or more antenna elements. The computer 226 can process the signals 218 and 220 as discussed with respect to FIG. 2C.

Figure 2C:
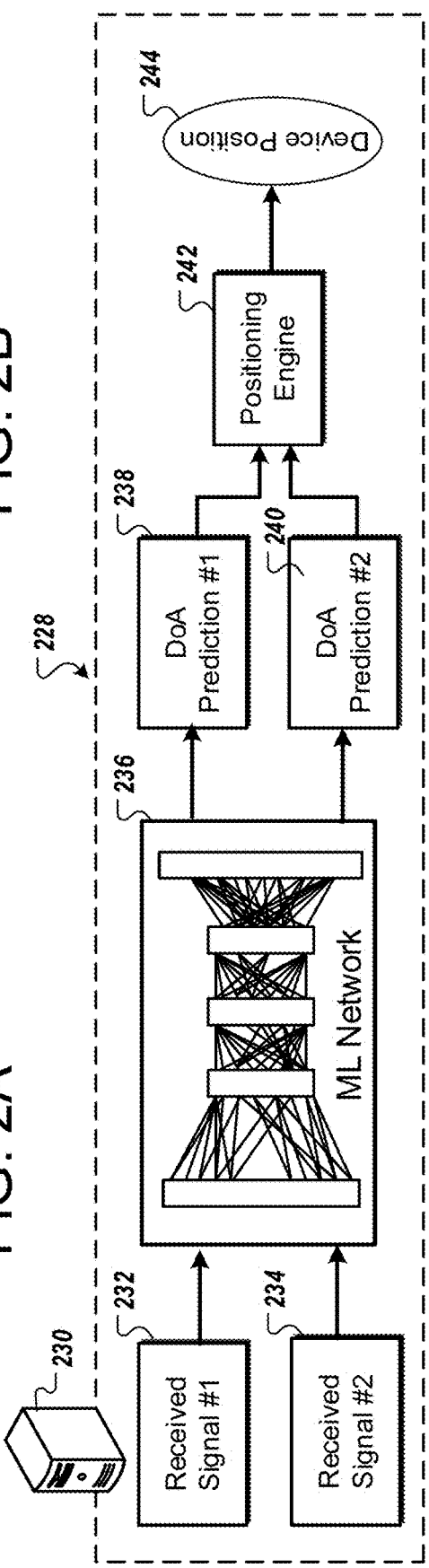
FIG. 2C is a diagram showing an example of a process for estimating DoA of electromagnetic energy.

FIG. 2C is a diagram showing an example of a process 228 for estimating DoA of electromagnetic energy. The process 228 is performed by the computer 230. The process 228 may be performed by one or more electronic systems, for example, the system 100 of FIG. 1, including the computer 104 and 116, as well as the computers 212 and 226 of FIG. 2A and FIG. 2B, respectively. As discussed in FIG. 2A and FIG. 2B, signals from devices in environments can be received by antenna arrays, such as antennas 208, 210, 222, and 224. Connected computing components, such as computer 212 and computer 226 can process signals received by the antenna arrays. In the example of FIG. 2C, the signals are used to determine a position of the transmitting device.

Determining a position of a transmitting device can be referred to as localization. Localization of a source of energy can be used to estimate the location of an RF transmitter, a line of bearing on this transmitter, among others. Localization can be useful in radar for estimating locations from which radar pulses are emitted or reflected, in communications systems for identifying spatial properties or locations of users in order to accurately model user behavior or optimize radio system performance, to map emitter or interferer locations, to perform channel or propagation mapping, or to detect changes in the locations, behaviors or properties of RF emitters.

The process 228 includes providing data corresponding to the received signal #1 232, such as signal 204 and 218, and data corresponding to the received signal #2, such as signal 206 and 220, to the machine learning network 236. As discussed in reference to FIG. 1 and the machine learning network 120, the machine learning network 236 can generate output indicating a DoA prediction of both signal #1 238 and signal #2 240.

In some implementations, the parameters of the machine learning network 236 depend on a given environment of deployment. For example, in the rural environment of FIG. 2A, the machine learning network 236 can use a first set of parameters based on training conducted in a similar rural environment. Similar environments can include similar features, similar amounts of features, or similar emitting devices. In another example, the machine learning network 236 can use a second set of parameters based on training conducted in an urban environment similar to the urban environment of FIG. 2B to determine the DoA of signals within the urban environment of FIG. 2B. In this way, the machine learning network 236 can adjust prediction output generation based on a current deployment environment.

The process 228 includes the computer 230 providing the prediction output obtained from the machine learning network 236 to a positioning engine 242. In some implementations, the positioning engine 242 determines a position of a transmitting device based, in part, on a known distance between antenna array elements. For example, in reference to FIG. 2A, the positioning engine 242 can determine or obtain from one or more connected sensors or input streams, a separation distance between the antenna 208 and the antenna 210. The positioning engine 242 can then triangulate to determine the position 244 of the drone 202 based on the separation distance and the DoA predictions 238 and 240.

In some implementations, multiple array elements on a single structure, such as the antenna 208, can be used to determine two separate DoAs and a separation distance such that the computer 230, or the computer 212 in the case of FIG. 2A, and the positioning engine 242 thereon, can determine the device position 244 based on signals received by the multiple array elements on the single structure.

Figure 3:
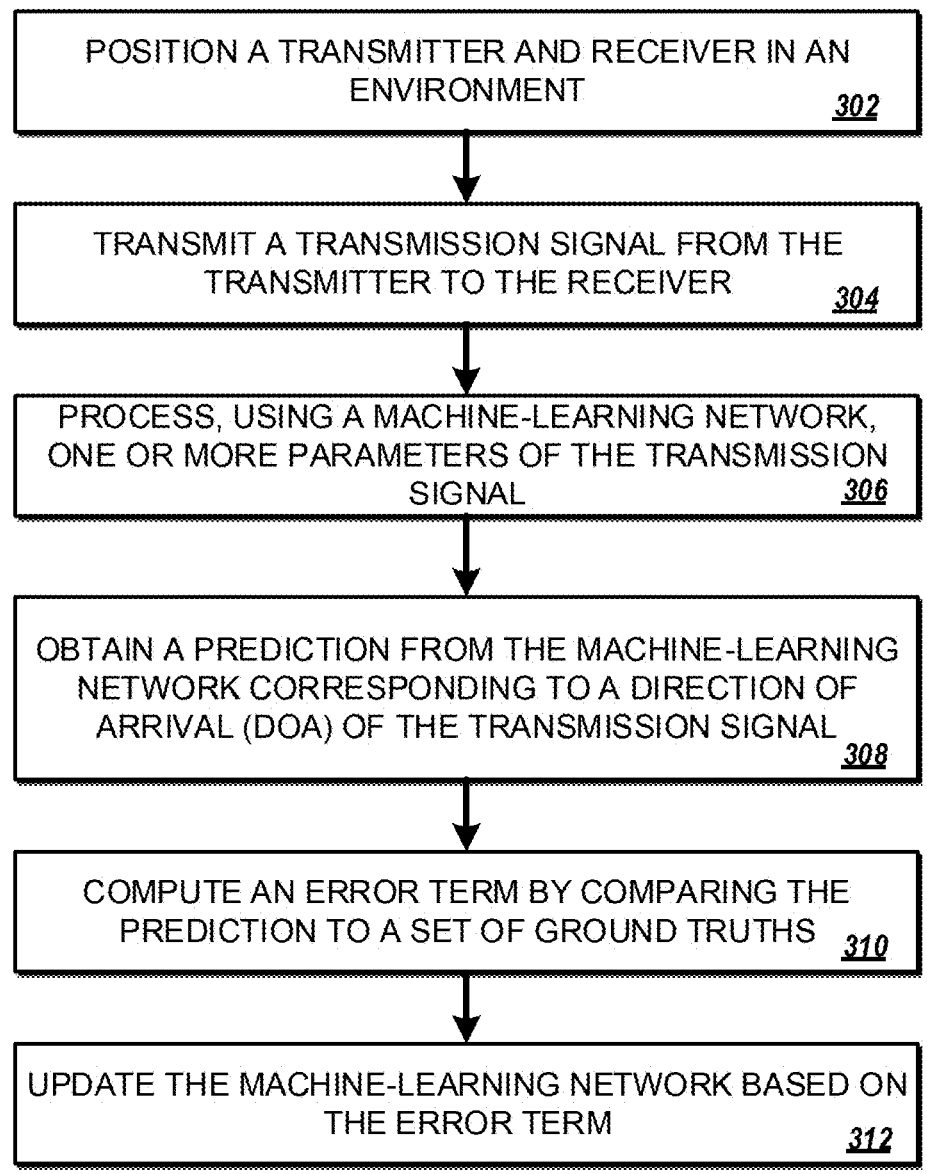
FIG. 3 is a diagram showing an example of a process for training a machine learning model for estimating DoA of electromagnetic energy.

FIG. 3 is a diagram showing an example of a process 300 for training a machine learning model for estimating DoA of electromagnetic energy. In some implementations, the process 300 is performed by one or more electronic systems, for example, the system 100 of FIG. 1, including one or more of the computers 104, 108 or 116. In some implementations, the process 300 is performed by one or more of 212, 226, or 230 of FIG. 2A, FIG. 2B, and FIG. 2C, respectively. In some implementations, the process 300 is performed by one or more of the systems 400 of FIG. 4A, 450 of FIG. 4B, 500 of FIG. 5A, 550 of FIG. 5B, 600 of FIG. 6A, or 650 of FIG. 6B. In the following sections, the process 300 is described primarily with respect to the system 100. However, the description is also applicable to the other systems noted above.

The process 300 includes positioning a transmitter and receiver in an environment (302). For example, as discussed in reference to FIG. 1, a user can manually position the computers 108 and 116 and antennas 110 and 114 within an existing environment or environment constructed by the user. Similarly, the computer 104 can synthetically generate antennas 110 and 114 at positions within a synthetically generated environment 102.

In some implementations, the environment is a three dimensional space. In some implementations, the three dimensional space is simulated, e.g., by the computer 104 of FIG. 1. For example, the three dimensional space can be simulated and the process 300 can further include generating a simulation of the radio signal receiver at the first location within the simulated three dimensional space and generating a simulation of the transmitter at the second location within the simulated three dimensional space.

In some implementations, the process 300 further includes obtaining, from a real-world radio, a second transmission signal received at the real-world radio; generating a direction of arrival estimate based on the second transmission signal using an estimation algorithm; processing the second transmission signal using the machine-learning network; in response to the processing, obtaining, from the machine-learning network, a second prediction corresponding to a direction of arrival of the second transmission signal; comparing the direction of arrival estimate to the second prediction; and updating the machine-learning network based on comparing the direction of arrival estimate to the second prediction.

In some implementations, the estimation algorithm includes at least one of a first direction of arrival algorithm or a second direction of arrival algorithm.

In some implementations, generating the direction of arrival estimate based on the second transmission signal using the estimation algorithm includes generating a first component of the direction of arrival estimate, wherein the first component comprises output of the first direction of arrival algorithm; weighting the first component by a first weight; generating a second component of the direction of arrival estimate, wherein the second component comprises output of the second direction of arrival algorithm; weighting the second component by a second weight; and combining the weighted first component and the weighted second component to generate the direction of arrival estimate.

The process 300 includes transmitting a transmission signal from the transmitter to the receiver (304). For example, the signal 106 is transmitted from the antenna 110 to the antenna 114. As the signal 106 propagates within the environment 102, the signal 106 can be affected by features of the environment, such as the environmental features 112. The various environmental features 112 can help to train the machine learning model 120 to estimate DoA of energy emitters based on the specific characteristics of the environment 102.

In some implementations, the transmission signal includes one or more parameters including a power level associated with the transmission signal.

The process 300 includes processing, using a machine-learning network, one or more parameters of the transmission signal (306). For example, the computer 116, as shown by its components within the boundary 117, can provide data corresponding to the received signal 118 to the machine learning network 120. The received signal 118 can include a time-frequency spectrum grid of pilot and data subcarriers and time slots within an OFDM signal block, as shown graphically in input plot 119.

In some implementations, a machine-learning network for estimating DoA, such as the machine-learning network 120 of FIG. 1, includes one or more of a transformer neural network, a regression neural network, a fully convolutional neural network, or a partially convolutional neural network.

The process 300 includes obtaining a prediction from the machine-learning network corresponding to a direction of arrival (DoA) of the transmission signal (308). For example, as discussed in FIG. 1, the computer 116 can obtain the output of the machine learning network 120. The output of the machine learning network 120 includes a DoA prediction 122. In some implementations, the output of the machine learning network 120 includes N neurons or output values each representing either a heading (e.g., a heading between 0 and 360 degrees) or a Null condition, indicating no signal. In the three-dimensional case, the output neurons can be pairs, corresponding to Azimuth and Elevation.

In some implementations, the system, such as the system 100, uses specific encoding techniques for training the machine learning network. For example, the system 100 can use label encoding, one hot encoding, frequency-based encoding, target mean encoding, binary encoding, hash encoding, among others, in training the machine learning network 120. In some implementations, frequency-based encoding is used to increase the agility of the network 120 for estimating DoA.

In some implementations, the prediction includes two or more angle probabilities, wherein each angle probability of the two or more angle probabilities indicates a likelihood of the transmission signal having arrived at a particular angle.

The process 300 includes computing an error term by comparing the prediction to a set of ground truths (310). For example, the computer 116 can use a difference between the prediction 122 and the ground truth data 124 to generate the error term 126. In some implementations, the error term 126 is an array with one or more elements indicating one or more difference values between the prediction 122 and the ground truth data 124.

In some implementations, the set of ground truths are obtained based on location data for the radio signal receiver and the transmitter. For example, location data can include positioning data (e.g., GPS, or the like) determined by a device or programmed by a user or other automated system.

The process 300 includes updating the machine-learning network based on the error term (312). For example, model updates can be calculated in the system 100 by elements such as the computer 116 to allow predictions of the machine learning network 120 to improve over time. The model updates can iteratively provide improved predictions of DoA upon training in representative environments. Methods such as gradient descent or other optimization methods can be used to minimize the error term 126 during multiple iterations of training.

In some implementations, updating the machine-learning network based on the error term includes determining, based on a loss function, a rate of change of one or more weight values within the machine-learning network; and performing an optimization process using the rate of change to update the one or more weight values within the machine-learning network.

In some implementations, the optimization process comprises one or more of gradient descent, stochastic gradient descent (SGD), Adam, RAdam, AdamW, or Lookahead neural network optimization.

In some implementations, the process 300 includes an optimization process that includes minimizing a loss value between predicted and actual values of subcarriers or channel responses.

In some implementations, the process 300 further includes rotating the transmitter within the simulated three dimensional space during transmission of the transmission signal.

In some implementations, the process 300 includes rotating the synthetic radio within the simulated three dimensional space during transmission of the transmission signal.

In some implementations, the process 300 includes obtaining details of a feature within a real-world environment; and generating a synthetic rendering of the feature in the simulated three dimensional space. For example, a user can provide details of the feature within the real-world. A computer, such as the computer 104 of FIG. 1, can then generate a synthetic version of the feature, by synthetically generating the geometry and programming the material of the specific feature. The synthetically generated feature can then be included in a synthetically generated environment 102.

In some implementations, the details of the feature within the real-world environment are provided by a user. For example, a user can capture an image of a feature, such as a table, building, tree, or any other object, with a smartphone device and provide an image of the object to a computer, such as the computer 104 of FIG. 1. The computer can detect features of the object and render the object in a synthetically generated environment 102 with geometry and material settings such that a synthetically generated propagating signal is affected by the synthetically generated feature in the same way a real-world signal would be affected by the real-world feature.

In some implementations, the transmission signal reflects off a surface of the synthetic rendering of the feature.

In some implementations, the process 300 includes generating a data set including information corresponding to the machine-learning network; and providing the data set to one or more processors through a network connection, wherein the one or more processors are configured to update local machine-learning networks based on the data set.

Figure 4A:
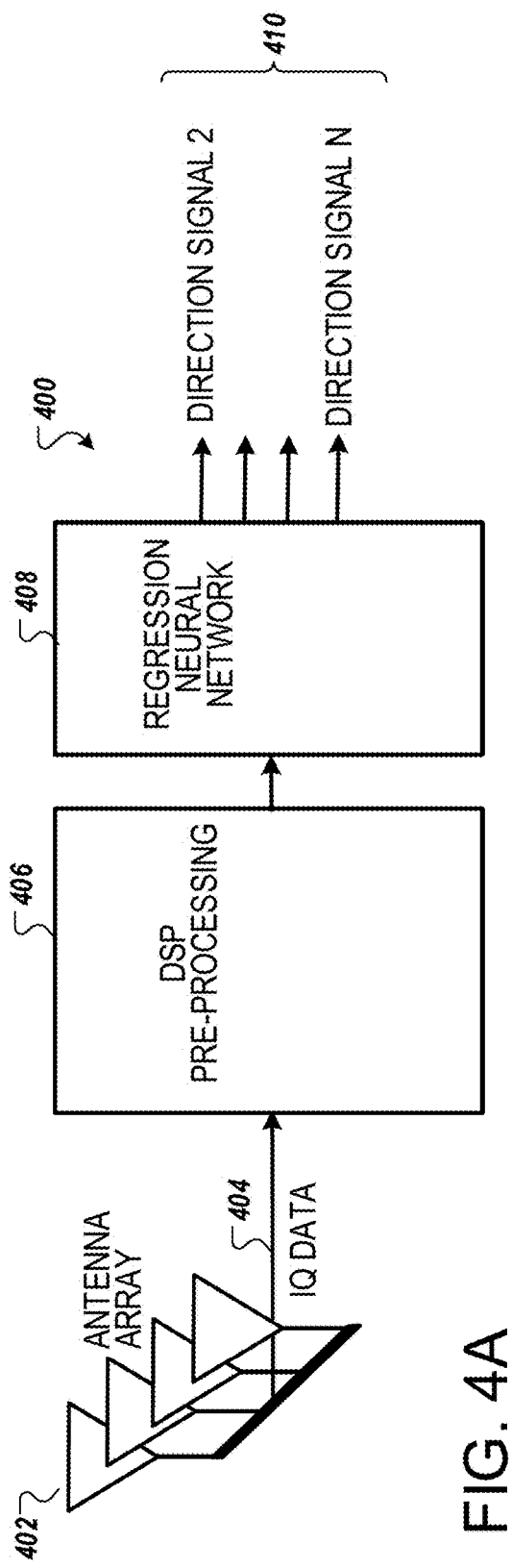
FIG. 4A is a diagram showing an example of a system for estimating DoA of electromagnetic energy using a regression neural network.

FIG. 4A is a diagram showing an example of a system 400 for estimating DoA of electromagnetic energy using a regression neural network 408. FIG. 4A demonstrates a high level approach to the direct regression system in some implementations. The inputs to the system 400 are parallel streams of EM energy from an antenna array 402, which includes one or more antennas, arranged in a uniform or non-uniform geometry. In some implementations, the EM energy is converted to complex baseband and sampled by an Analog to Digital Converter (ADC) (not shown), producing complex In-Phase and Quadrature (IQ) data streams, which is shown as IQ data 404. In some implementations, the first stage in the system is a digital signal processing (DSP) pre-processing block 406 which can include one or more traditional DSP stages (e.g. filtering, tuning, resampling, analog to digital conversion) and performs signal processing. In some implementations, the system 400 does not include the DSP pre-processing block 406, but processes the data corresponding to the EM energy, such as the IQ data 404, using a neural network, such as the regression neural network 408.

As shown, the output of the DSP pre-processing block 406 is provided as an input to the Regression Neural network 408. In some implementations, the input to the Regression Neural network 408 also includes some combination of raw/filtered IQ data (e.g., time series sampled radio data that may be represented in in-phase (I) and quadrature (Q), complex baseband representation), or expert features. The output of the Regression block 408 includes N neurons or output values 410, each representing either a direction signal (e.g., heading between 0 and 360 degrees), or a Null condition, indicating no signal. In the three dimensional case, the output neurons can be pairs, corresponding to Azimuth and Elevation.

In some implementations, components of the system 100 of FIG. 1 perform operations discussed in reference to FIG. 4A. For example, the machine learning network 120 can be a regression neural network and the computer 116 can be configured to, at least in some implementations, perform one or more DSP processing operations, such as filtering, tuning, resampling, or analog to digital conversion, among others. The prediction 122 can include one or more of the output values 410 indicating a direction signal. If in training mode, the ground truth data 124 can include one or more values for each of the signal directions of the output values 410 in order to generate an error term 126 that includes one or more values corresponding to the signal directions.

Figure 4B:
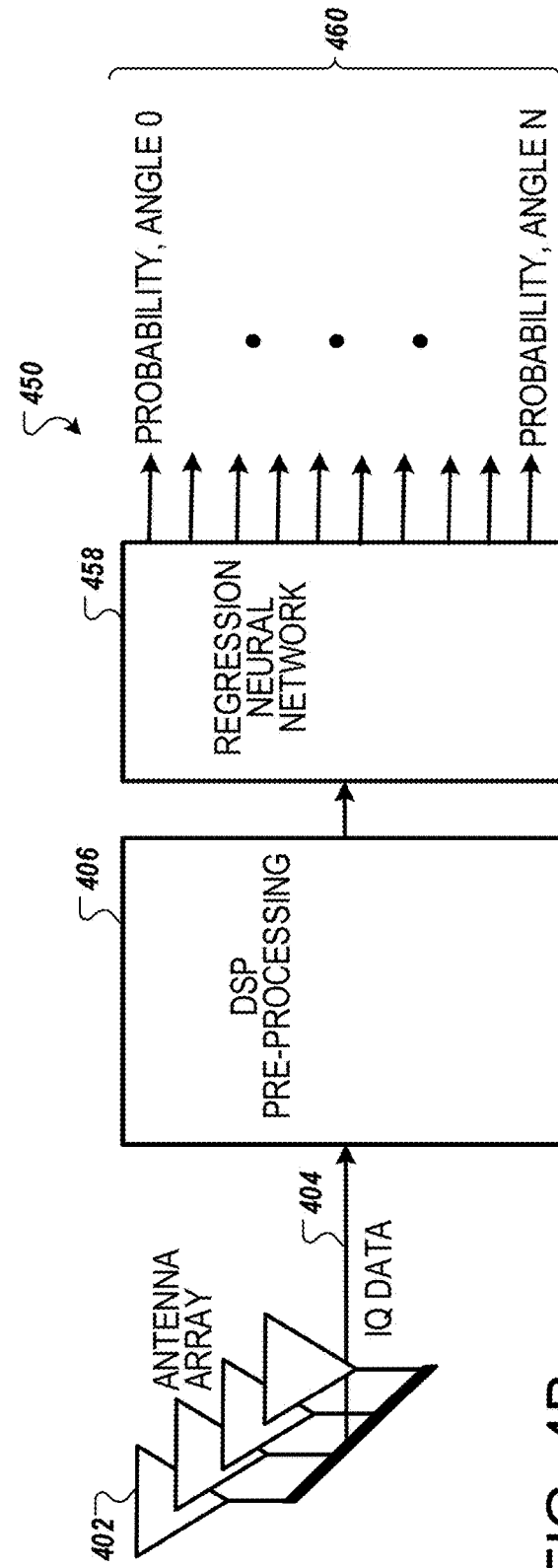
FIG. 4B is a diagram showing an example of a system for estimating DoA of electromagnetic energy using a quantized regression neural network.

FIG. 4B is a diagram showing an example of a system 450 for estimating DoA of electromagnetic energy using a quantized regression neural network 458. The other components of the system 450—the antenna array 402, IQ data 404 and DSP pre-processing block 406—are similar to those described above with respect to the system 400. Accordingly, the system 450 is similar to the system 400, except for having a different quantized regression neural network 458. In some implementations, as shown by the quantized regression network 458 in FIG. 4B, the output of the regression network 458 is represented by N neurons or outputs 460. Each neuron or output, of the outputs 460, can correspond to a quantized angle within the field of view of the system 450 (e.g., one of N discrete direction regions or angle ranges (n) from which the signal may have originated), instead of each neuron representing a single signal. In this case, the output 460 can include a vector of probabilities or likelihoods of a signal being present arriving from direction of arrival n.

In some implementations, components of the system 100 of FIG. 1 perform operations discussed in reference to FIG. 4B. For example, the machine learning network 120 can be a quantized regression neural network and the computer 116 can be configured to, at least in some implementations, perform one or more DSP processing operations, such as filtering, tuning, resampling, or analog to digital conversion, among others. The prediction 122 can include one or more of the output values 460 indicating, for each region in a set of one or more regions, the probability of a signal originating from that given region of space. If in training mode, the ground truth data 124 can include one or more values for each of the regions of the output values 460 in order to generate an error term 126 that includes one or more values corresponding to the one or more regions of space.

Figure 5A:
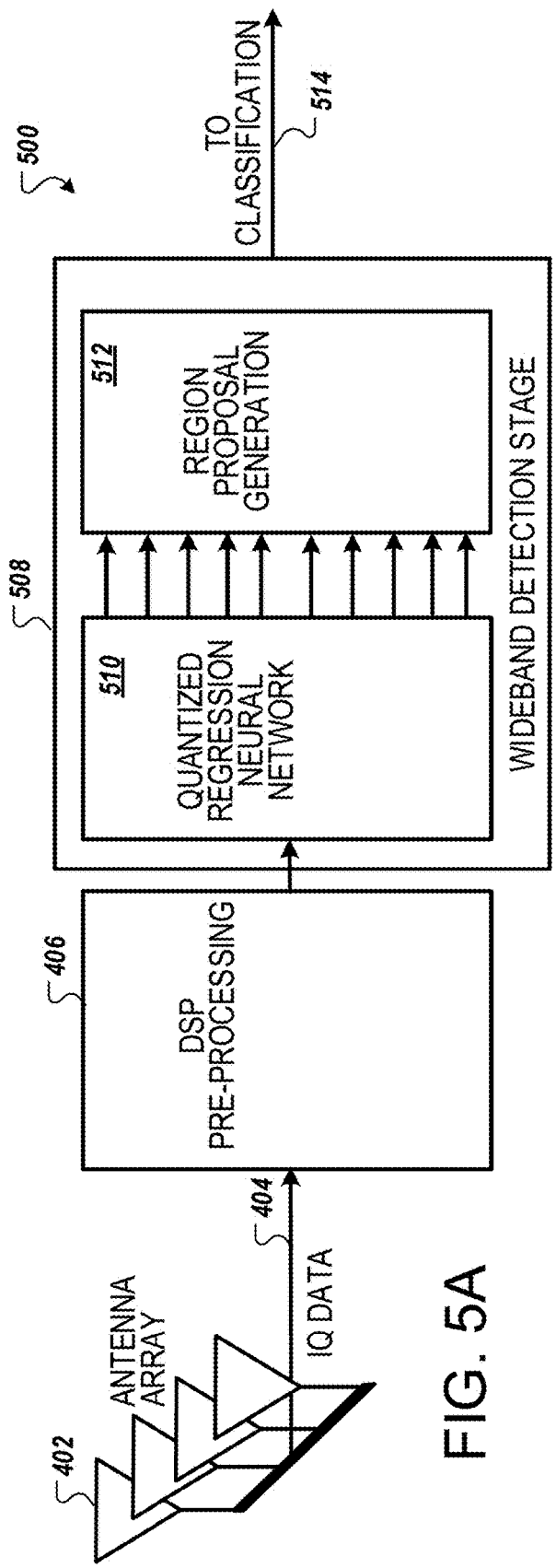
FIG. 5A is a diagram showing an example of a system for estimating DoA of electromagnetic energy using a quantized regression neural network as a classification engine.

FIG. 5A is a diagram showing an example of a system 500 for estimating DoA of electromagnetic energy using a quantized regression neural network 510 as a classification engine within a wideband detection stage 508. Some components of the system 500—the antenna array 402, IQ data 404 and DSP pre-processing block 406— are similar to those described above with respect to systems 400 and 450. Though any of the networks 408, 458, and 510 may be deployed in a wideband capacity, the quantized form of the network 458 and 510, as shown in FIG. 4B and FIG. 5A respectively, can integrate with a larger detection and region proposal mechanism within a wideband detection stage 508, as shown in FIG. 5A, because the quantized form of the network 458 can provide a channelized view of the direction finding problem.

By simultaneously viewing both spatial and frequency dimensions, the quantized network 458 and 510 can separate signals which overlap in either the frequency domain, or the spatial domain. In this case, the output of the quantized network 510 is provided as an input for a region proposal engine 512. In some implementations, the combination includes a detection head, which takes wideband aggregate spectrum as input, and isolates regions of frequency, space and time for additional post processing, such as classification or demodulation.

In some implementations, components of the system 100 of FIG. 1 perform operations discussed in reference to FIG. 5A. For example, the machine learning network 120 can be a quantized regression neural network and the computer 116 can be configured to, at least in some implementations, perform one or more DSP processing operations, such as filtering, tuning, resampling, or analog to digital conversion, among others. In at least one implementation, the computer 116 includes a region proposal engine. For example, the computer 116 can provide the output of the machine learning network 120 to the region proposal engine to generate the prediction 122 that includes a classification of one or more detected signals. If in training mode, the ground truth data 124 can include a known or generated classification for a given detected signal. The computer 116 can then generate an error term 126 that includes a difference between the known or generated classification and the classification of the prediction 122.

Figure 5B:
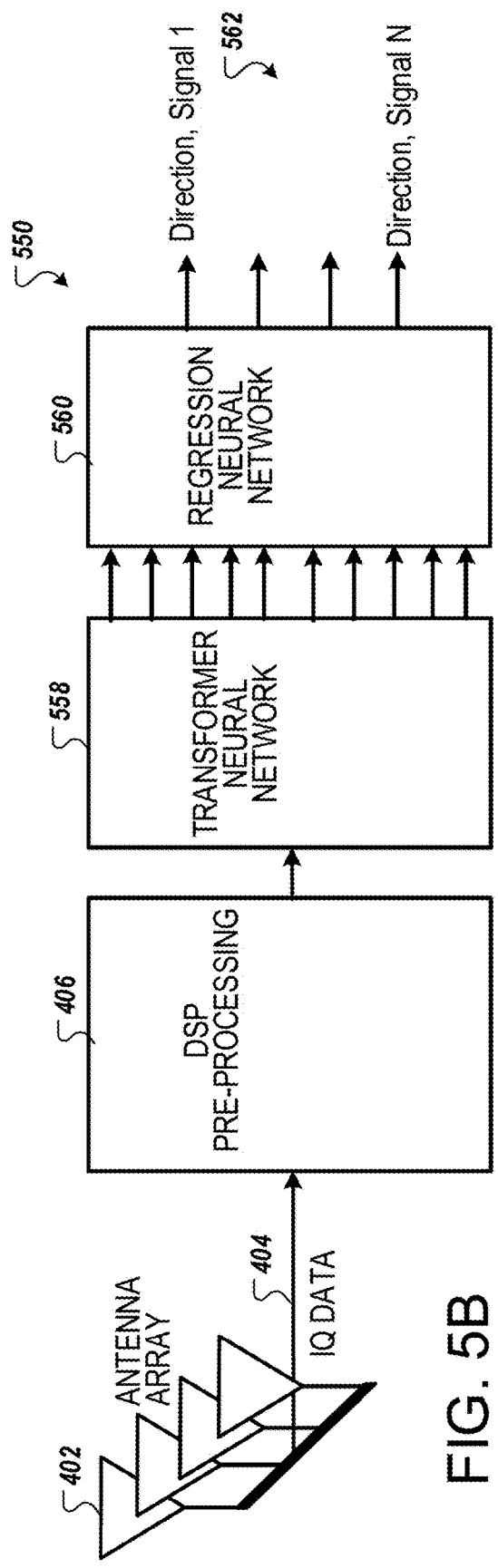
FIG. 5B is a diagram showing an example of a system for estimating DoA of electromagnetic energy using a transformer neural network.

FIG. 5B is a diagram showing an example of a system 550 for estimating DoA of electromagnetic energy using a transformer neural network 558. Some components of the system 550—the antenna array 402, IQ data 404 and DSP preprocessing block 406—are similar to those described above with respect to systems 400, 450, and 500. As shown in FIG. 5B, the transformation neural network 558 obtains output from the DSP pre-processing block 406 that can perform one or more processes (e.g. traditional filtering, rate changing, or normalization operations, among others). The input to the transformer block 558 includes N streams of IQ data, corresponding to N antenna elements of the antenna array 402. The output includes M streams of IQ data, or an equivalent compact representation (e.g., covariance matrix) corresponding to M antenna elements (or digital outputs from sub-arrays if more than M array elements).

Figure 6A:
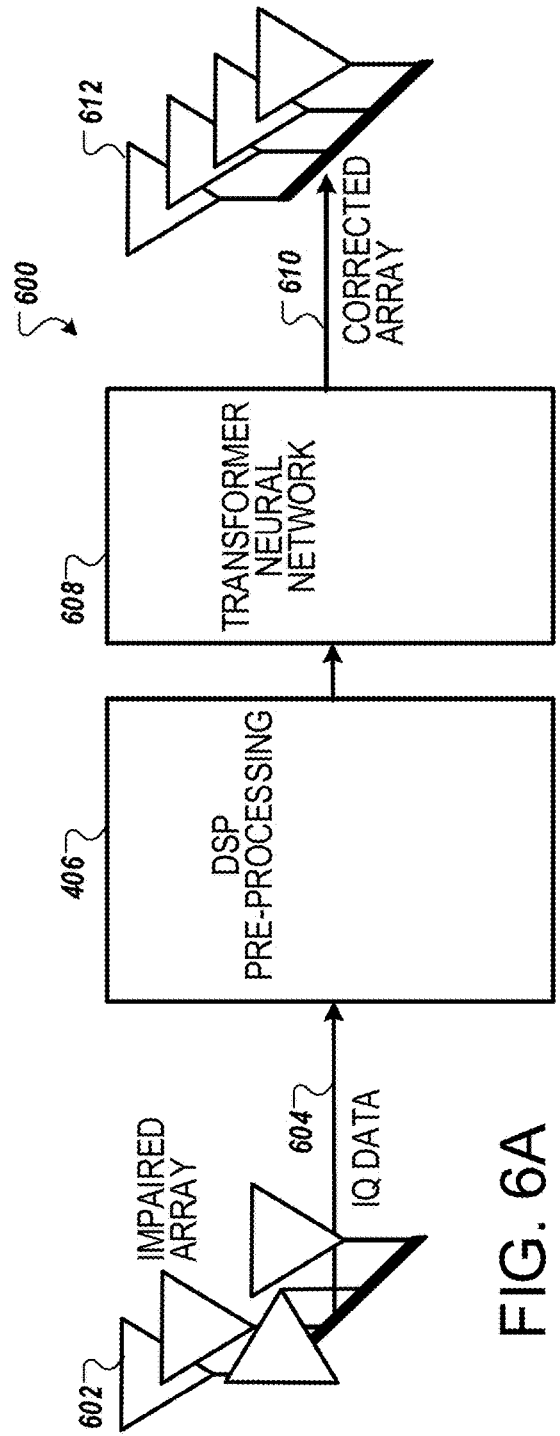
FIG. 6A is a diagram showing an example of a system for a transformer neural network to correct an impaired array.

In some implementations, components of the system 100 of FIG. 1 perform operations discussed in reference to FIG. 5B. For example, the machine learning network 120 can be a regression neural network and the computer 116 can be configured to, at least in some implementations, perform one or more DSP processing operations, such as filtering, tuning, resampling, or analog to digital conversion, among others. In some implementations, the system 100 includes a transformer network, such as the transformer network 558. For example, the computer 116 can process the received signal 118 using a transformer network. The computer 116 can obtain output of the transformer network and provide the output to the machine learning network 120. The prediction 122 can include one or more of the output values 562 indicating a direction signal. If in training mode, the ground truth data 124 can include one or more values for each of the signal directions of the output values 562 in order to generate an error term 126 that includes one or more values corresponding to the signal directions. FIG. 6A is a diagram showing an example of a system 600 for a transformer neural network 608 to improve an array 602. As shown, the array 602, which is impaired, can provide input in the form of EM energy. The EM energy can be represented as IQ data 604. The DSP pre-processing block 406 is similar to that described above with respect to the systems 400, 450, 500 and 550. The DSP pre-processing block 406 can perform one or more processes (e.g. traditional filtering, rate changing, or normalization operations, among others) on the IQ data 604, generating an output that is provided to the transformer neural network 608. In the case where M=N or the number of array elements before a transformer network, such as the transformer network 608, and the number of array elements after a transformer network are equal, the network can be thought of as a calibration, or impairment correction stage, as shown in FIG. 6A.

In some implementations, the output 610 of the transformer neural network 608 is equivalent to the output of a conventional hardware or software-based linear array 612. For example, the transformer neural network 608 can pass data to another software algorithm or machine learning network that processes the data for direction finding, spatial isolation, spatial transmission, or any other appropriate processing stage for received or generated signals. In some implementations, the other software algorithm or machine learning network assumes, based on the data output of the transformer neural network shown in FIG. 6A, that the data was received with no impaired array elements.

In this way, the system 600 can be used within traditional classification or processing systems. For example, without changing the processing techniques, a system, such as a legacy system, can employ the impairment correction of the transformer network 608 before applying one or more processing techniques. By including the transformer network 608 before processing, a system can improve accuracy, as well as efficiency, of signal processing without changing actual processing methods or quality of antennas that transmit or receive the signals.

In some implementations, components of the system 100 of FIG. 1 perform operations discussed in reference to FIG. 6A. For example, the computer 116 can include a transformer network, such as the transformer neural network 608. In some implementations, the computer 116 processes the received signal 118 using a transformer network. For example, the computer 116 can provide the received signal to a transformer network. The computer 116 can obtain output from the transformer network and provide the output to the machine learning network 120. In this way, the quality of the received signal 118 can effectively be improved before additional processing, such as processing to estimate a DoA, is performed.

Figure 6B:
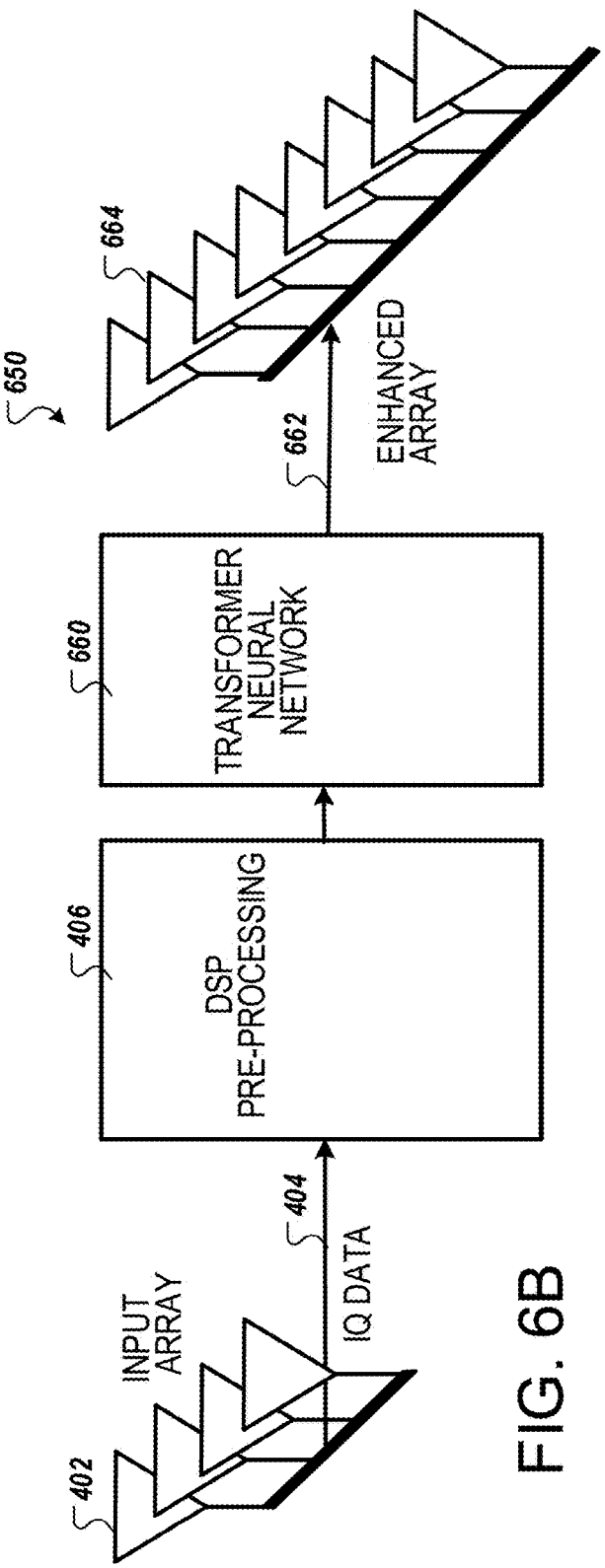
FIG. 6B is a diagram showing an example of a system for a transformer neural network to improve an array.

FIG. 6B is a diagram showing an example of a system 650 for a transformer neural network 660 to improve the array 402. The array 402, IQ data 404, and DSP pre-processing block 406 are similar to that described above with respect to the systems 400, 450, 500, 550, and 600. The output of the DSP pre-processing block 406 is provided to the transformer neural network 660. In the case where the number of array elements before a transformer network, such as the transformer network 660, is less than the number of array elements after a transformer network or M>N, the network can be viewed as a form of array interpolation or super-resolution, as shown in FIG. 6B, in which the general capacity of the array 402 is enhanced through the application of the neural network as a generalized non-linear estimation tool. In some implementations, the modified output 662 of the input array of FIG. 6B is output by the transformer neural network 660 as the equivalent of a higher resolution array 664. The output 662 of the transformer neural network 660 can transfer data to additional software algorithms or systems which may assume the samples come from a coherent linear array.

In some implementations, components of the system 100 of FIG. 1 perform operations discussed in reference to FIG.

6B. For example, the computer 116 can include a transformer network, such as the transformer neural network 660. In some implementations, the computer 116 processes the received signal 118 using a transformer network. For example, the computer 116 can provide the received signal to a transformer network. Similar to the transformer neural network 660, the transformer neural network can be configured to generate output of a linear array with increased resolution. The computer 116 can obtain output from the transformer network and provide the output to the machine learning network 120 or other processing stages. In this way, the quality of the received signal 118 can effectively be improved before additional processing, such as processing to estimate a DoA, is performed.

In general, supervised learning problems can be broken down into either classification or regression problems. Classification problems generally attempt to assign discretely valued labels to input data, whereas regression problems generally attempt to approximate the input/output relationship of a mathematical function (i.e. a continuous valued function output value). For the purposes of the disclosed DoA approach, the primary analysis is framed as a regression problem; however certain parts of the larger estimation framework can involve some labeling as well. Further supervision may be used in portions of the task such as the array transform which may then generalize to many unknown extensions of the problem with un-labeled or unsupervised data. There may additionally be methods of this system where purely un-labeled data is used to train, but where additional information such as consistent tracks over time, or correlation of time, power, and angle may be used to further provide supervision without direct knowledge of the target regression value (i.e. a known labeled DoA).

Direct DoA Estimation (DDE) from Arbitrary Arrays

Most direction finding solutions are focused on Uniform Arrays of some kind—either linear, planar, or circular, where the spacing between each array element is constant. These geometries are favored for a number of reasons, primarily related to numerical tractability and dense matrix representation of the array response. In addition, uniform array response conforms to a series of assumptions required for subspace decomposition methodologies—specifically that the response matrix have Vandermonde, left centro-hermitian properties (for MUltiple SIgnal Classification (MUSIC)-based algorithms) or shift-invariance properties (e.g. estimation of signal parameters via rotational invariance techniques (ESPIRIT)).

Though uniform and linear arrays are typical ways to constrain the problem, a more interesting scenario in the context of direction finding is the non-uniform array geometry. The disclosed techniques employ Neural Networks both as a novel solution to the Uniform/Linear Array case, as well as a State-of-the-Art approach to the non-uniform array problem. A non-uniform array can take two forms—a sparse non-uniform array (SNUA), which is effectively a uniform array (UA) with missing elements, and a random non-uniform array (RNUA), which is an array with no location constraints on the element locations, such that the position of the elements are represented by random variables. Both of these cases make closed-form methods for direction finding more challenging, but also represent a more accurate model for real-world arrays, which, in general, are not likely to be made to perfectly conform with various mathematical assumptions.

The SNUA case is used to model element failure in phased arrays, and can be reduced to a problem of inferring missing entries in the array covariance matrix. Likewise, methods such as sub-array spatial smoothing can be employed to reduce the effects of missing or failed elements. Some of these methods rely on the assumption that the array response matrix is still sufficiently dense, and performance deteriorates when more elements are missing, or when missing elements are adjacent to other missing elements.

A constrained version of the RNUA case is employed as a means to correct geometric and electrical imperfections in real arrays. By assuming a statistical bounds for the impairment, an imperfect array can be transformed into an ideal array through a transformation, via a mapping matrix. This process, sometimes referred to as "array interpolation," represents a large field of research into not only methods by which impaired arrays can be corrected, but also methods by which physical arrays can be synthetically transformed to have different properties, or to produce sub-array structures, or to produce unique array responses/beam patterns. With this background, the disclosed approach to generalized non-uniform array processing using Neural Networks represents a novel method for correcting non-linear array impairments, as well as the array interpolation problem. Furthermore, the disclosed techniques are equally valid when applied to passive sensor array processing, as well as radar array processing.

Array Transformation Network

As previously alluded, there is significant opportunity for the usage of neural networks, such as deep neural networks (DNNs) as described herein in the area of array transformation and interpolation, to address the problems in contemporary models (e.g. contemporary models may not capture complex non-linear relationships often in more closed form expressions). Most of the contemporary models require that an impaired array be "nearly linear," such that the estimation problem can be modeled approximately as a linear transformation.

One technique by which this is accomplished is a process known as sectorization, in which the total field of view of the target array is broken down into a discrete set of angular regions, across which there is a more linear response than the total array. Intuitively, an antenna array with an impaired response, or simply a response which is otherwise non-uniform due to an irregular geometric distribution of array elements will manifest as a response which is a nonlinear function of the angle of incident energy. Therefore, by breaking the field of view up into discrete sectors, the process of estimating a transformation matrix for a given sector should more closely resemble a linear estimation problem.

In addition to correcting for array impairments, this same sectorization paradigm is frequently applied to achieve a form of synthetic super-resolution. In general, the angular resolution of DoA estimation for a given array (e.g., the ability to separate multiple signals with nearly the same incident angles) is a function of the number of elements, and the total arc of the field of view. This can be demonstrated by following the MUSIC algorithm and observing that the rank of the array response covariance matrix is the limiting factor in subspace decomposition algorithms, such that at most, N eigenvalues can be produced from an array with N elements, and at least one of these roots is assumed to correspond to a noise vector.

This implies that for arrays with greater than N−1 signals results in an angular ambiguity on the order of $$\Delta\theta = \frac{\theta_{max}}{N}$$

where θ_max is the total field of view of the array. That is, signals incident within this region will tend to blur together into a single peak as the separation approaches Δθ.

However, to the degree that the array has a differentiable (preferably linear) response in the interval $$\left[\theta, \theta + \frac{\theta_{max}}{N}\right],$$

it is possible to estimate the response of a virtual array over this interval—effectively increasing the resolution of Δθ by constraining θ_max. For a theoretically perfect uniform array, this process can be iterated infinitely, and reduces simply to a continuous array manifold calculation for an arbitrary number of elements at an arbitrary number of angles. However, for a real sector with an imperfect array response $A_{sv}$, or for a non-uniform array, the process requires an extra step, which is the calculation of an array transformation matrix B for estimating the virtual response in each sector $A_{sv}$, which is done by applying a least squares linear estimator to the overdetermined system, as shown by $BA_{sr}=A_{sv}$ and $B=A_{sv}A_{sr}^{H}(A_{srA_{sv}}{}^{H})^{-1}$.

The cumulative error of the estimate on this interval is then a function of the square error of this transformation process $$\frac{\|BA_{sr} - A_{sv}\|}{\|A_{sv}\|}.$$

Once an estimate for B is available, which projects the real array response onto the desired response, this transformation can be applied directly to the covariance matrix, or even the raw input stream $X_N[t]$ across N antennas, shown by $X_N[t]=BX_n[t]$ and $R_{xxe}=BR_{xx}B^H$.

Intuitively, the error of this process is conditioned by the error of the prevailing estimation and interpolation process. For the linear estimation technique shown, this becomes a function of the linearity of the response over this region as well as the magnitude of any stochastic contributions to the impairment model. In the case where these stochastic impairments are normally distributed, and the array response is approximately linear, this process generates the Maximum Likelihood estimator for the sector.

There are several aspects of this estimation process which are worth enumerating. First, that in general, the use of standard interpolation techniques to generate the transformation matrix naturally favors the decomposition of the total field of view (FoV) into smaller and smaller sectors, since drawing the target resolution towards zero, and the number of virtual sectors towards infinity reduces the mean error simply by virtue of approaching the tangent of the true transfer function for a zero-width segment. Theoretically, a one-to-one mapping of transformations to critical-resolution angles would force the error to zero. That is, we would produce a system for which there exists an independent transformation matrix for every step of resolution Δθ in the total field of view.

The problem with this interpretation, and where the primary tradeoff enters the discussion, is that in order to select the correct transformation matrix, a coarse angle of arrival corresponding to this sector has to be estimated initially. This reduces the problem back to the original issue of the whole-FoV angular resolution being limited by the properties of the physical array. A brute-force approach can be built by trying every possible critical-resolution sector transformation for each array sample, but this approach grows exponentially in computational complexity. It is useful to select a compromise between resolution and sector size which is specific to the target array.

The second notable implication of the previous formulation is that the naive least squares regression approach produces a model for which the error is a function of the validity of the underlying regression model. For a linear least squares estimation, this means that the size of the broad region of convergence is defined by the smallest sector over which the array response appears sufficiently linear. However, this view can be expanded by applying a non-linear estimation method, such as by iterative Taylor series expansion, which removes the linear error condition and replaces it with a much less restrictive requirement that the sector response be locally differentiable by a finite-order Taylor polynomial. Following this same line of reasoning, the estimation constraint may be relaxed one step farther, for example, by an estimation technique relying on local differentiability—auto-regression with one or more neural networks such as a Deep Neural Network (DNN).

The disclosed techniques, including the systems 400 of FIG. 4A, 450 of FIG. 4B, 500 of FIG. 5A, 550 of FIG. 5B, 600 of FIG. 6A, and 650 of FIG. 6B, replace the estimation of B in $R_{xxe}=BR_{xx}B^H$ with a trained neural network.

In addition to the utility for calibration and enhancement, the transformer neural network, such as the transformer neural network of FIGS. 5B, 6A, and 6B, serves to allow a single trained regression network to be re-used with multiple arrays. Since the regression network and the transformer network are separate and independent components of the system, switching between physical arrays only requires the inclusion of a different transformer network, instead of an entirely separate regression network. An example of how this would be useful is with very large bandwidth scenarios In some implementations, training begins by using a generic model trained to perform DoA regression in the simulation domain. The model is updated for a specific (physical) array or deployment scenario by capturing target signals from one or more test positions using the target sensor/array. Such an implementation is shown in FIG. 1 in the case where the environment 102 is simulated. These recordings are then used to generate training examples to update the model trained in simulation (e.g., transfer learning). This manual training process can be repeated until the quality of the model is suitable (e.g., meets minimum criteria for accuracy/precision, satisfies a threshold, among others). Once a minimally viable model is produced, a semi-supervised training method may be deployed in order to iteratively enhance the quality of the model without the need for additional data collection. A semi-supervised training method can include generating ground truth data based on traditional DoA methods as discussed in reference to FIG. 1.

In some implementations, a plurality of different radio emitters is used within a system, such as the system 100 of FIG. 1. For example, the system 100 can include drones, handheld radios, phones, vehicles with telemetry and radar emissions or reflections, computing devices with wireless connectivity, or a range of different other types of intended or unintended emitters. The emitters can include antennas that emit wireless signals in the EM spectrum which arrive at some angle θ at an array of antennas, such as the antenna 114 of FIG. 1. The antenna 114 can be both sparse and non-uniformly spaced. In general, antennas within the system 100 or other systems described herein, can be configured to fit the surface of a structure, vehicle, spacecraft, tower, among other structural objects.

In some implementations, subsets of antennas are digitized through an analog to digital converter (ADC). The ADC may have additional hardware components such as tuners, filters, cancelers, cables or transmission over larger distances (e.g., the array need not be compact and tightly co-located in all cases such as with traditional uniform linear arrays.) In some cases, the digitized radio samples streams are further pre-processed. For example, the digitized radio samples streams can be further pre-processed by filtering, tuning, channelizing, calibrating, or similar, using DSP pre-processing circuitry.

In some implementations, the digitized radio sample streams are passed into a trained transformer or regression neural network. The trained transformer or regression neural network can take one of several forms as described herein. The network outputs several predictions such as an angle of arrival, predictions as to whether a signal is present coming from one or more directions, or the prediction of a signal arriving at a traditional uniform linear array. The output of the system includes a set of predictions of emitters which are arriving at various angles in two or three-dimensional coordinate systems, along with confidence values, and in some cases additional class predictions, or other properties which have been predicted about the signals.

In some implementations, the output is logged or stored for future usage. In some implementations, the output is transmitted over a network (e.g. to a database or network protocol). In some implementations, the output is used to trigger an additional application or signal processing stage (e.g. a demodulation routine, or other further DSP stage). In some implementations, the output is used to alert or conduct analytics on the emitters and their locations. In some implementations, internet of things (IOT) is used to perform updates to other spatial processing stages (e.g. beam forming, interference cancellation, pre-coding for transmission, or other such operations). In an exemplary implementation, a radio processing platform runs the neural network and a set of digital processing stages, which may comprise a software radio, a processor, or other platform.

In some implementations, the system, such as the system 100, takes the form of an embedded system specially built for test and measurement, for interference or radio monitoring (e.g., identifying interference, jamming, unauthorized or malfunction types and direction of arrival or location), for electronic protection, for radio processing on a base station, a Wi-Fi system, or another radio transceiver station. For example, in a base station, the disclosed techniques can be used to combine array elements from uniform or non-uniform arrays for channel estimation, uplink processing, downlink pre-coding/transmission, interference cancellation, array compensation, estimation of user equipment (UE) location, track or behavior, or any suitable combination of these.

In some implementations, the system 100 includes one or more Massive multiple input, multiple output (MIMO) arrays. For example, the disclosed techniques can be used on Massive MIMO arrays for 4G, 5G, 6G systems or otherwise, as well as when considering distributed multi-arrays or smart reflectors or other extended array apertures. Similarly, in Wi-Fi systems, the disclosed techniques can be used to improve multi-antenna reception, direction of arrival estimation, processing of uplink and downlink signals to improve capacity, among others.

In some implementations, the disclosed techniques are implemented on a vehicle such as a UAV, unmanned underwater vehicles (UUV), unmanned ground vehicle (UGV), or other such systems. In some cases, a system implementing the disclosed techniques may be mobile, or fixed in a location. In some implementations where the system is mobile, multiple DoA estimates may be combined along with other information and platform telemetry in order to obtain location estimates for emitters.

In some implementations, multiple such platforms may combine their DoA and other estimates in order to obtain location estimates from fixed platforms. In some cases, multiple DoA estimates from one emitter may be combined over time given known properties of the emitters (such as spatial coherence and constraints of traveling emitters) in order to obtain location estimates from a single fixed platform. In the case of such usage on a communication system such as a base station, nonlinear transformation or beamforming transformation can be used to separate transmissions.

For example, nonlinear transformation or beamforming transformation can be used to separate transmissions from multiple uplink users upon reception, or can be used in reverse to transmit to multiple users on the downlink such as is performed in 5G base station systems using more conventional processing algorithms. Thus applications across wireless sensing, mapping, spectral/spatial awareness, interferer localization, threat detection, and MIMO or multi-user, multiple-input, multiple-output (MU-MIMO) communications systems can be aided by such a system by benefitting from better spatial processing, more tolerance and degrees of freedom in the array layout, and reduced computational, calibration and modeling complexity and cost.

In some implementations, use cases include:

Deployment of neural networks, such as DNNs, as a generalized auto-regression engine for directly estimating the incident angle of electromagnetic energy over a multi-element antenna array.

The Neural Network Engine can operate independently, or in the presence of traditional DSP pre-processing stages, such as filters, correlators, or re-samplers.

The Neural Network engine can operate with or without the presence of other Neural Signal processing applications, such as those described in U.S. application Ser. No. 16/017,396, U.S. application Ser. No. 15/961,465, or U.S. application Ser. No. 16/864,516, the entire contents of each of which are incorporated herein by reference.

The DoA estimate can be used to augment a signal classification pipeline such as those described in U.S. application Ser. No. 16/017,396, U.S. application Ser. No. 15/961,465, or U.S. application Ser. No. 16/864,516, or to refine the search and tracking parameters (such as sector revisit rate, dwell time, or beam width) of an array scanning or beam controller or control algorithm.

The Neural Network engine can operate in either wideband mode, or narrowband mode. In wideband mode, the Neural Network can estimate both the number of incident signals, and their direction or arrival. In Narrowband mode, the Neural Network can assume there is either one or zero signals.

The direct-regression technique can be applied to arrays with uniform and non-uniform geometry having one or more major dimensions.

The direct-regression technique can be applied to direction finding in a single dimension (e.g., azimuth) or multiple dimensions (e.g., azimuth or elevation).

Training of the Neural Network can be performed using a combination of synthetic and real (e.g., captured in the field) data.

An array transformation Neural Network (NN) can be used as a pre-processing stage ahead of the direct regression network. The transformation network can be used to perform array calibration, and can be trained independently of the regression model. The transformation network can be used to project an arbitrary array geometry onto a known array geometry for which there is a pre-trained regression network. The transformation network can be used to implement array interpolation and super-resolution using the creation of synthetic antenna elements along each array dimension.

Implementations include a software framework by which the direct-regression network can be trained through a combination of supervised and semi-supervised learning techniques, operating on either live data or spectral recordings. In semi-supervised mode, the software framework can employ a detection and isolation pre-processing stage, followed by a traditional DoA estimation algorithm (e.g., root-music) which can compute a ground-truth estimate for training the direct-regression network. In supervised mode, the software framework can operate on spectral recordings and present the user with the ability to manually isolate signals of interest, and compute a variety of legacy DoA metrics, which can then be used to manually assign a ground truth estimate to the signals of interest.

Figure 7:
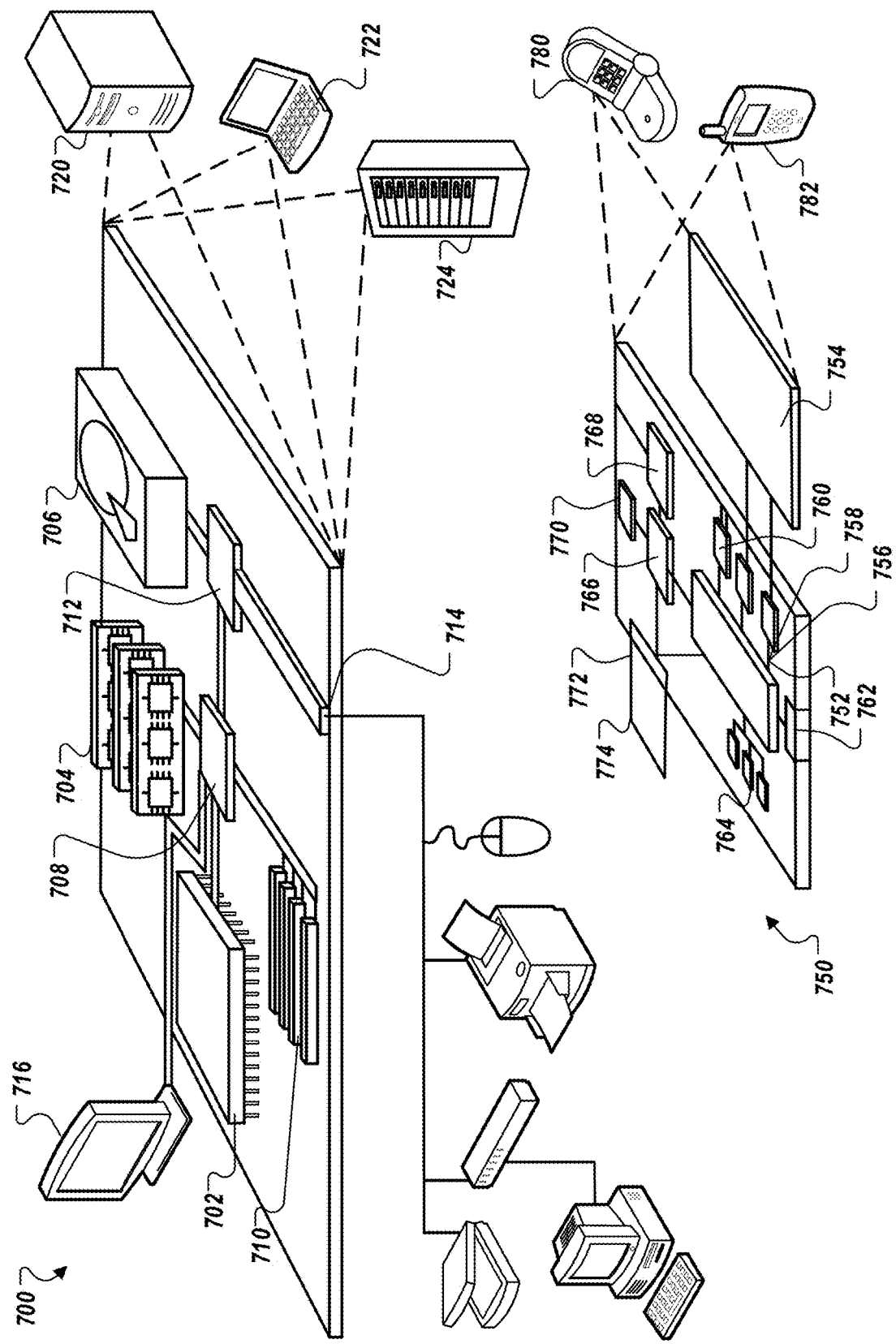
FIG. 7 is a diagram illustrating an example of a computing system used for estimating DoA of electromagnetic energy.

FIG. 7 is a diagram illustrating an example of a computing system 700 used for estimating DoA of electromagnetic energy. The computing system 700 includes computing device 700 and a mobile computing device 750 that can be used to implement the techniques described herein. For example, in some implementations, the computing device 700 or the mobile computing device 750 represent one or more components of the system 100, such as a computer system implementing the machine-learning network 120 or performing the operations of the computers 104, 108, and 116; devices that access information from the machine-learning network 120, computers 104, 108, and 116; or a server that accesses or stores information regarding the operations performed by the machine-learning network 120, computers 104, 108, and 116. Additionally or alternatively, the computing device 700 or the mobile computing device 750 can be used to perform operations of the systems 400 of FIG. 4A, 450 of FIG. 4B, 500 of FIG. 5A, 550 of FIG. 5B, 600 of FIG. 6A, and 650 of FIG. 6B.

The computing device 700 is intended to represent various forms of digital computers, such as laptops, desktops, workstations, personal digital assistants, servers, blade servers, mainframes, and other appropriate computers. The mobile computing device 750 is intended to represent various forms of mobile devices, such as personal digital assistants, cellular telephones, smart-phones, mobile embedded radio systems, radio diagnostic computing devices, and other similar computing devices. The components shown here, their connections and relationships, and their functions, are meant to be examples only, and are not meant to be limiting.

The computing device 700 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and may be mounted on a motherboard or in other manners as appropriate. The processor 702 can process instructions for execution within the computing device 700, including instructions stored in the memory 704 or on the storage device 706 to display graphical information for a GUI on an external input/output device, such as a display 716 coupled to the high-speed interface 708. In other implementations, multiple processors and/or multiple buses may be used, as appropriate, along with multiple memories and types of memory. In addition, multiple computing devices may be connected, with each device providing portions of the operations (e.g., as a server bank, a group of blade servers, or a multi-processor system). In some implementations, the processor 702 is a single threaded processor. In some implementations, the processor 702 is a multi-threaded processor. In some implementations, the processor 702 is a quantum computer.

The memory 704 stores information within the computing device 700. In some implementations, the memory 704 is a volatile memory unit or units. In some implementations, the memory 704 is a non-volatile memory unit or units. The memory 704 may also be another form of computer-readable medium, such as a magnetic or optical disk.

The storage device 706 is capable of providing mass storage for the computing device 700. In some implementations, the storage device 706 may be or include a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 702), perform one or more methods, such as those described above. The instructions can also be stored by one or more storage devices such as computer- or machine readable mediums (for example, the memory 704, the storage device 706, or memory on the processor 702). The high-speed interface 708 manages bandwidth-intensive operations for the computing device 700, while the low-speed interface 712 manages lower bandwidth-intensive operations. Such allocation of functions is an example only. In some implementations, the high speed interface 708 is coupled to the memory 704, the display 716 (e.g., through a graphics processor or accelerator), and to the high-speed expansion ports 710, which may accept various expansion cards (not shown). In the implementation, the low-speed interface 712 is coupled to the storage device 706 and the low-speed expansion port 714. The low-speed expansion port 714, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. In addition, it may be implemented in a personal computer such as a laptop computer 722. It may also be implemented as part of a rack server system 724. Alternatively, components from the computing device 700 may be combined with other components in a mobile device, such as a mobile computing device 750. Each of such devices may include one or more of the computing device 700 and the mobile computing device 750, and an entire system may be made up of multiple computing devices communicating with each other.

The mobile computing device 750 includes a processor 752, a memory 764, an input/output device such as a display 754, a communication interface 766, and a transceiver 768, among other components. The mobile computing device 750 may also be provided with a storage device, such as a micro-drive or other device, to provide additional storage. Each of the processor 752, the memory 764, the display 754, the communication interface 766, and the transceiver 768, are interconnected using various buses, and several of the components may be mounted on a motherboard or in other manners as appropriate.

The processor 752 can execute instructions within the mobile computing device 750, including instructions stored in the memory 764. The processor 752 may be implemented as a chipset of chips that include separate and multiple analog and digital processors. The processor 752 may provide, for example, for coordination of the other components of the mobile computing device 750, such as control of user interfaces, applications run by the mobile computing device 750, and wireless communication by the mobile computing device 750.

The processor 752 may communicate with a user through a control interface 758 and a display interface 756 coupled to the display 754. The display 754 may be, for example, a TFT (Thin-Film-Transistor Liquid Crystal Display) display or an OLED (Organic Light Emitting Diode) display, or other appropriate display technology. The display interface 756 may include appropriate circuitry for driving the display 754 to present graphical and other information to a user. The control interface 758 may receive commands from a user and convert them for submission to the processor 752. In addition, an external interface 762 may provide communication with the processor 752, so as to enable near area communication of the mobile computing device 750 with other devices. The external interface 762 may provide, for example, for wired communication in some implementations, or for wireless communication in other implementations, and multiple interfaces may also be used.

The memory 764 stores information within the mobile computing device 750. The memory 764 can be implemented as one or more of a computer-readable medium or media, a volatile memory unit or units, or a non-volatile memory unit or units. An expansion memory 774 may also be provided and connected to the mobile computing device 750 through an expansion interface 772, which may include, for example, a SIMM (Single In Line Memory Module) card interface. The expansion memory 774 may provide extra storage space for the mobile computing device 750, or may also store applications or other information for the mobile computing device 750. Specifically, the expansion memory 774 may include instructions to carry out or supplement the processes described above, and may include secure information also. Thus, for example, the expansion memory 774 may be provide as a security module for the mobile computing device 750, and may be programmed with instructions that permit secure use of the mobile computing device 750. In addition, secure applications may be provided via the SIMM cards, along with additional information, such as placing identifying information on the SIMM card in a non-hackable manner.

The memory may include, for example, flash memory and/or NVRAM memory (nonvolatile random access memory), as discussed below. In some implementations, instructions are stored in an information carrier such that the instructions, when executed by one or more processing devices (for example, processor 752), perform one or more methods, such as those described above. The instructions can also be stored by one or more storage devices, such as one or more computer- or machine-readable mediums (for example, the memory 764, the expansion memory 774, or memory on the processor 752). In some implementations, the instructions can be received in a propagated signal, for example, over the transceiver 768 or the external interface 762.

The mobile computing device 750 may communicate wirelessly through the communication interface 766, which may include digital signal processing circuitry in some cases. The communication interface 766 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), LTE, 5G/6G cellular, among others. Such communication may occur, for example, through the transceiver 768 using a radio frequency. In addition, short-range communication may occur, such as using a Bluetooth, Wi-Fi, or other such transceiver (not shown). In addition, a GPS (Global Positioning System) receiver module 770 may provide additional navigation- and location-related wireless data to the mobile computing device 750, which may be used as appropriate by applications running on the mobile computing device 750.

The mobile computing device 750 may also communicate audibly using an audio codec 760, which may receive spoken information from a user and convert it to usable digital information. The audio codec 760 may likewise generate audible sound for a user, such as through a speaker, e.g., in a handset of the mobile computing device 750. Such sound may include sound from voice telephone calls, may include recorded sound (e.g., voice messages, music files, among others) and may also include sound generated by applications operating on the mobile computing device 750.

The mobile computing device 750 may be implemented in a number of different forms, as shown in the figure. For example, it may be implemented as a cellular telephone 780. It may also be implemented as part of a smart-phone 782, personal digital assistant, or other similar mobile device.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the invention have been described. Other embodiments are within the scope of the following claims. For example, the steps recited in the claims can be performed in a different order and still achieve desirable results.

What is claimed is:

1. A method performed by at least one processor to train at least one machine-learning network to process a received communication signal, the method comprising:

positioning a radio signal receiver at a first location within a three dimensional space;

positioning a transmitter at a second location within the three dimensional space;

transmitting a transmission signal from the transmitter to the radio signal receiver;

processing, using a machine-learning network, one or more parameters of the transmission signal received at the radio signal receiver;

in response to the processing, obtaining, from the machine-learning network, a prediction corresponding to a direction of arrival of the transmission signal transmitted by the transmitter;

computing an error term difference by comparing the prediction to a set of ground truths, wherein (i) the set of ground truths include a known direction of arrival from the transmitter to the radio signal receiver and (ii) the set of ground truths correspond to the machine-learning network; and updating the machine-learning network based on the error term difference.

2. The method of claim 1, wherein the prediction comprises:

two or more angle probabilities, wherein each angle probability of the two or more angle probabilities indicates a likelihood of the transmission signal having arrived at a particular angle.

3. The method of claim 1, wherein the three dimensional space is simulated, and the method further comprises:

generating a simulation of the radio signal receiver at the first location within the simulated three dimensional space; and generating a simulation of the transmitter at the second location within the simulated three dimensional space.

4. The method of claim 3, further comprising:

obtaining, from a real-world radio, a second transmission signal received at the real-world radio;

generating a direction of arrival estimate based on the second transmission signal using an estimation algorithm;

processing the second transmission signal using the machine-learning network;

in response to the processing, obtaining, from the machine-learning network, a second prediction corresponding to a direction of arrival of the second transmission signal;

comparing the direction of arrival estimate to the second prediction; and updating the machine-learning network based on comparing the direction of arrival estimate to the second prediction.

5. The method of claim 4, wherein the estimation algorithm comprises at least one of a first direction of arrival algorithm or a second direction of arrival algorithm.

6. The method of claim 5, wherein generating the direction of arrival estimate based on the second transmission signal using the estimation algorithm comprises:

generating a first component of the direction of arrival estimate, wherein the first component comprises output of the first direction of arrival algorithm;

weighting the first component by a first weight;

generating a second component of the direction of arrival estimate, wherein the second component comprises output of the second direction of arrival algorithm;

weighting the second component by a second weight; and combining the weighted first component and the weighted second component to generate the direction of arrival estimate.

7. The method of claim 1, further comprising:

rotating the transmitter within the three dimensional space during transmission of the transmission signal.

8. The method of claim 1, wherein the set of ground truths are obtained based on location data for the radio signal receiver and the transmitter.

9. The method of claim 1, further comprising:

rotating the radio signal receiver within the three dimensional space during transmission of the transmission signal.

10. The method of claim 1, wherein the three dimensional space is simulated, and the method further comprises:

obtaining details of a feature within a real-world environment; and generating a synthetic rendering of the feature in the simulated three dimensional space.

11. The method of claim 10, wherein the details of the feature within the real-world environment are provided by a user.

12. The method of claim 10, wherein the transmission signal reflects off a surface of the synthetic rendering of the feature.

13. The method of claim 1, further comprising:

generating a data set including information corresponding to the machine-learning network; and providing the data set to one or more processors through a network connection, wherein the one or more processors are configured to update local machine-learning networks based on the data set.

14. The method of claim 1, wherein the machine-learning network comprises one or more of a transformer neural network, a regression neural network, a fully convolutional neural network, or a partially convolutional neural network.

15. The method of claim 1, wherein updating the machine-learning network based on the error term difference comprises:

determining, based on a loss function, a rate of change of one or more weight values within the machine-learning network; and performing an optimization process using the rate of change to update the one or more weight values within the machine-learning network.

16. The method of claim 15, wherein the optimization process comprises one or more of gradient descent, stochastic gradient descent (SGD), Adam, RAdam, AdamW, or Lookahead neural network optimization.

17. The method of claim 15, wherein the optimization process involves minimizing a loss value between predicted and actual values of subcarriers or channel responses.

18. The method of claim 1, wherein the one or more parameters of the transmission signal include a power level associated with the transmission signal.

19. A non-transitory, computer-readable medium storing one or more instructions executable by a computer system to perform operations comprising:

positioning a radio signal receiver at a first location within a three dimensional space;

positioning a transmitter at a second location within the three dimensional space;

transmitting a transmission signal from the transmitter to the radio signal receiver;

processing, using a machine-learning network, one or more parameters of the transmission signal received at the radio signal receiver;

in response to the processing, obtaining, from the machine-learning network, a prediction corresponding to a direction of arrival of the transmission signal transmitted by the transmitter;

computing an error term difference by comparing the prediction to a set of ground truths, wherein (i) the set of ground truths include a known direction of arrival from the transmitter to the radio signal receiver and (ii) the set of ground truths correspond to the machine-learning network; and updating the machine-learning network based on the error term difference.

20. A system, comprising:

one or more processors; and machine-readable media interoperably coupled with the one or more processors and storing one or more instructions that, when executed by the one or more processors, perform operations comprising:

positioning a radio signal receiver at a first location within a three dimensional space;

positioning a transmitter at a second location within the three dimensional space;

transmitting a transmission signal from the transmitter to the radio signal receiver;

processing, using a machine-learning network, one or more parameters of the transmission signal received at the radio signal receiver;

in response to the processing, obtaining, from the machine-learning network, a prediction corresponding to a direction of arrival of the transmission signal transmitted by the transmitter;

computing an error term difference by comparing the prediction to a set of ground truths, wherein (i) the set of ground truths include a known direction of arrival from the transmitter to the radio signal receiver and (ii) the set of ground truths correspond to the machine-learning network; and updating the machine-learning network based on the error term difference.

* * * * *